United States Patent [19]

Drewery et al.

[11] 4,296,434
[45] Oct. 20, 1981

[54] METHOD OF AND APPARATUS FOR MOVEMENT PORTRAYAL WITH A RASTER E.G. TELEVISION, DISPLAY

[75] Inventors: John O. Drewery, Coulsdon; Richard Storey, Sutton, both of England

[73] Assignee: British Broadcasting Corporation, London, England

[21] Appl. No.: 43,608

[22] Filed: May 29, 1979

[30] Foreign Application Priority Data

May 30, 1978 [GB] United Kingdom ............... 23924/78

[51] Int. Cl.³ .......................................... H04M 5/30
[52] U.S. Cl. .................................. 358/105; 358/185; 358/22
[58] Field of Search ............. 358/105, 104, 185, 106, 358/139, 13, 22, 24; 340/258; 273/DIG. 28

[56] References Cited

U.S. PATENT DOCUMENTS

| | | | |
|---|---|---|---|
| 4,025,718 | 5/1977 | Paretti | 358/105 |
| 4,090,221 | 5/1978 | Connor | 358/105 |
| 4,168,510 | 9/1979 | Kaiser | 358/105 |
| 4,179,704 | 12/1979 | Moore et al. | 358/105 |

FOREIGN PATENT DOCUMENTS 1328355 8/1973 United Kingdom .
1497177 1/1978 United Kingdom .

OTHER PUBLICATIONS

J. K. Moore et al., "A Recent Innovation in Digital Special Effects", SMPTE Journ. 10-78, vol. 87, No. 10, pp. 673-676.

*Primary Examiner*—Robert L. Richardson
*Assistant Examiner*—Edward L. Coles
*Attorney, Agent, or Firm*—Robert F. O'Connell

[57] ABSTRACT

To portray movement in a television display, a field of the signal is stored in an image store (110), and subsequent input fields are compared in a motion detector (104) with the stored field to detect differences between them due to movement. A flag is retained in an auxiliary store (114) to indicate the positions in the field of the detected differences. For those positions for which a new difference is detected, i.e. for which no difference has been detected previously, the corresponding portions of the then current input scan are stored in the image store (110), by a switch (106) being connected to the input (102). For portions which are flagged, the output of the auxiliary store (114) causes the switch (106) to take the output of the image store (110), thus insetting past positions of movement into the current field. The background of the field in the image store is nevertheless updated by the background of the input field. To allow for the 4-field NTSC or 8-field PAL cycle, transducers, or predictors, (170,160) are placed at the input and output of the image store (110) such that the image store retains information in one state only of the cycle. The motion detector (104) comprises a subtractor, a rectifier and a low-pass filter.

22 Claims, 25 Drawing Figures

|   | ODD | EVEN | | ODD | EVEN | |
|---|---|---|---|---|---|---|
| A | n+N | n+2N | n+2N+1 | n+3N+1 | n+4N+1 | n+4N+2 |
| B | n+N | n+N | n+2N+1 | n+N | n+N | n+4N+2 |
| C | n-1 | n+N | n+N+1 | n+N | n+N | n+3N+2 |
| D | FLAG | FLAG | NO FLAG | FLAG | FLAG | NO FLAG |
| E | NO FLAG | FLAG | NO FLAG | FLAG | FLAG | NO FLAG |
| F | n | n+N | n+N+1 | n+2N+1 | n+N | n+3N+2 |
| G | n-1 | n+N-1 | n+N | n+N | n+3N | n+N |
| H | NO FLAG | FLAG | NO FLAG | NO FLAG | FLAG | NO FLAG |
| J | NO FLAG | NO FLAG | FLAG | FLAG | NO FLAG | FLAG |

METHOD OF AND APPARATUS FOR MOVEMENT PORTRAYAL WITH A RASTER E.G. TELEVISION, DISPLAY

INTRODUCTION

This invention relates to a method of and apparatus for the portrayal of movement with a raster display, for example with a cathode ray tube display such as a television or visual display unit (VDU).

BRIEF SUMMARY OF THE INVENTION

An object of the invention is to provide a realistic simulation of the path of a moving object by showing a superposition of images at the positions which it occupies at selected instants of time.

BRIEF DESCRIPTION OF THE DRAWINGS

The invention in its various aspects is defined in the appended claims to which reference should now be made.

The invention will be described in more detail, by way of example, with reference to the drawings, in which.

DETAILED DESCRIPTION OF THE INVENTION

Broadly speaking, the basis of the method to be described lies in the detection of field-to-field differences created by a moving object, together with the generation of a 'flag' signal indicating the position of such differences. When an object moves it creates two differences, the one being in its former position and the other in its new position. The flag is used to differentiate between old and new positions, for during each new scan every old position will already have been flagged and the positions of only the new differences will be unflagged. During old differences the old picture information corresponding to a previous field is transmitted to the output but during new differences the new picture information is transmitted. In this way the moving object is correctly displayed but, in addition, leaves images behind it.

Figure 1:
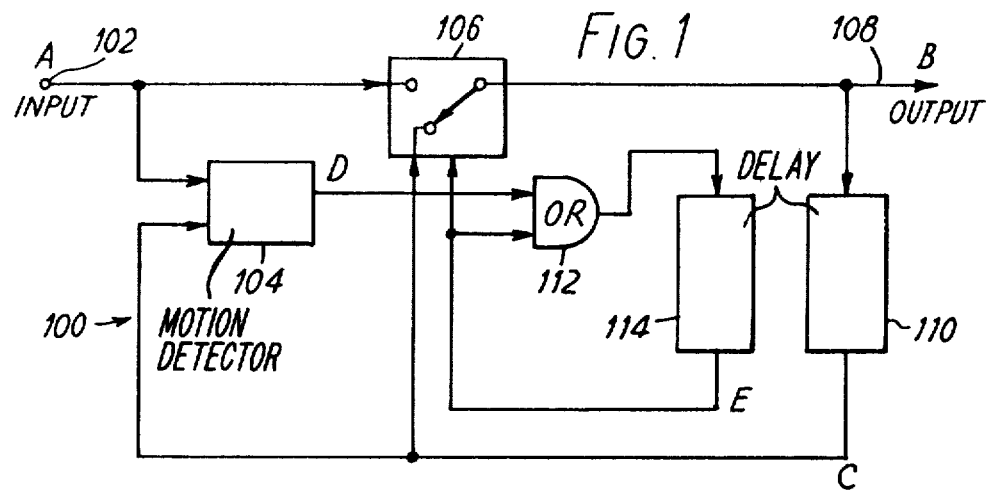
FIG. 1 is a block circuit diagram of a first form of apparatus embodying the invention.

FIG. 1 illustrates a first form of apparatus embodying the invention. The apparatus 100 has an input 102 connected to a motion detector 104 and to one input of a selector switch 106. One example of the motion detector is described below with reference to FIG. 14. The output of switch 106 constitutes the output 108 of the apparatus and is also applied to the input of a one-field delay or image store 110. The output of the delay 110 is applied both to the other input of the motion detector 104 and to the other input of the switch 106. The output of the motion detector 104 is applied to an OR gate 112, the output of which is in turn fed to a one-field delay 114. Whereas the delay 110 stores the field in eight-bit digital form, the delay 114 has only one bit position for each picture element. The output of the auxiliary delay 114 is applied to control the selector switch 106.

The operation of the apparatus of FIG. 1 is as follows. It is assumed that an 8-bit PCM digital monochrome television signal is received at the input 102. Such a signal will be used for purposes of illustration, however the invention is in no way limited to the particular type. Examples of use with colour signals are given below. Any field-to-field difference is sensed by the motion detector 104 which takes feeds of the current input field signal from input 102 and the previous output field signal available from the one-field delay 110. The output of the detector 104 is a two-state signal indicating the presence or absence of movement, i.e. it takes the value 1 or 0 accordingly. It will be appreciated that such a detector will contain a threshold adjustment to guard against small differences due to noise, picture unsteadiness and small amounts of movement. The detector output signal thus "flags" all significant differences for the current field and is fed to the auxiliary delay 114, which has the same length as the main delay 110, after being gated in gate 112 with the flag signal for the previous field available at the output of delay 114. This flag signal indicates the position of "old" differences, and is used to switch the switch 106 from position A to position C whenever a flag occurs. In this way the old positions of any moving object or objects are transmitted to the output 108 and effectively keyed into the background. However, the new positions of the moving objects are also transmitted to the output with switch 106 in position A as their differences are not accompanied by a flag signal at the output of delay 114.

Strictly, the OR gate 112 is unnecessary if the background signal is constant, because once an image is keyed in it will create the same difference signal field after field, so reinforcing the flag signal for the previous field. However, if the background changes sufficiently slowly to escape detection by the motion detector 104 is may possibly change to a value that causes no difference when the stored image is keyed in, and the resulting flag will disappear. Thus the keyed images may be 'wiped off' by changing backgrounds. This may be of value if the keyed images are deliberately caused to decay, as described later, but otherwise the gate 112 provides protection against this happening.

Figure 2:
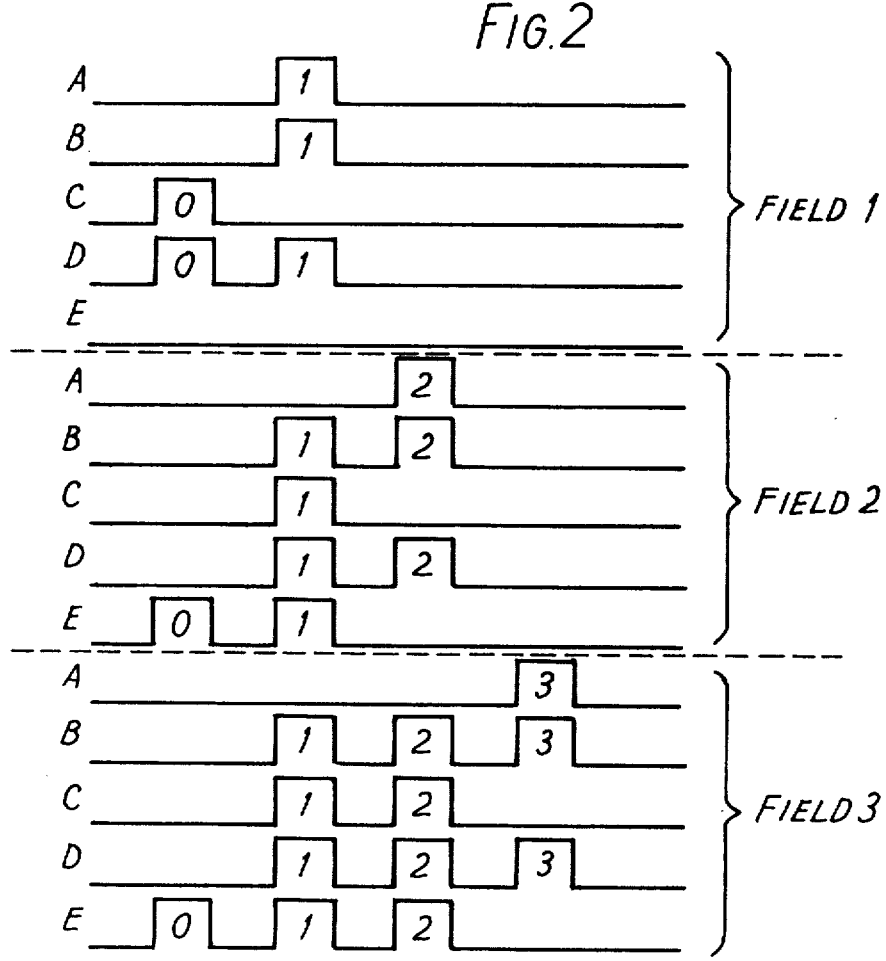
FIG. 2 shows waveforms arising in the apparatus of FIG. 1.

FIG. 2 shows the waveforms that occur at various points A to E in the circuit shown in FIG. 1. Before tracking starts, the delay or flag store 114 contains the value zero, so that E is zero and the output B equals the input A with the delay 110 containing normal picture material. Suppose then that flag signals are allowed to enter delay 114 while on object is moving from left to right. FIG. 2 shows the resulting waveforms for three successive fields when the object is in three successive positions 1, 2 and 3. After an initial singularity in which the background is keyed in at position 0, the waveforms D and E develop a signal which protects the previous positions of the object from erasure. It will be noted the waveforms D and E are identical apart from the initial singularity and the position of the new material.

In pictorial terms, what is happening is this. The store 110 holds a record of the last field supplied to the output. The motion detector 104 compares the next incoming field with the stored field and ascertains the differences. The assumption is that these differences represent motion of an object, e.g. a ball. To remove noise and other minor changes between pictures the movement detector includes a threshold device. Assuming then that the ball moves from a position 0 to position 1 on field 1, the movement detector will detect two differences, one corresponding to the position of the ball in field 0, and which it has now left, and the other corresponding to the position of the ball in field 1, which is new. Thus, two flags are entered into the flag store 114. Previous to this there were no flags in store 114, so that the switch 106 applies the whole of field 1 to the output 108, and the ball is shown in position 1.

Now during the next field, field 2, the motion detector compares field 2 with the output which was obtained during field 1. This will produce two new flags, corresponding to the differences between fields 1 and 2, and identified in FIG. 2 as the position the ball left in field 1 and the new ball position in field 2. During this field therefore, by virtue of the OR gate 112, flags will be entered in store 114 at all of positions 0, 1 and 2. During field 2 the flags which were entered into store 114 during field 1 are used to control switch 106. When a flag appears at the outpt of store 114, the signal portion from the store 110 (containing the previous output field) is substituted for the current input field. As flags are stored at positions 0 and 1, during these positions, portions of the stored field are inset into the current field. For the initial position 0 this is of no consequence, but for position 1 this means that the ball position 1 is inset into field 2, so the output now shows both positions 1 and 2. This continues successively to show subsequent ball positions 3 onwards.

It will be noted that once a flag is entered in the flag store 114 in respect of any picture point, thereafter now subsequent input information relating to that picture point can reach the output. This overcomes the problem of distinguishing whether any change detected arises because the ball has just reached or just left any given position, though it does give rise to the singularity in respect of position 0 as noted above.

An important feature of the circuit is that the current field is compared with the immdiately preceding field. It would in principle, be possible simply to store a reference field at the beginning of the sequence and compare incoming fields with the reference field. In fact, this is unsatisfactory. If there is any change in the background scene with respect to this reference field, the motion detector will be triggered. It will be triggered over the whole picture display if the sun emerges from behind a cloud, for example, and will be triggered if trees move in a slight breeze. The resultant effect is highly undesirable and is subjectively unacceptable in practice. With the arrangement of FIG. 1, however, (and of the subsequent figures) the comparison is made between successive fields, only a fraction of a second apart, rather than over a time period which may extend to a number of seconds. The chances of any background movement between two successive fields exceeding the movement detector thereshold are very much less than for two fields so widely separated in time.

The length of delays 110 and 114 must be approximately one field period, for if it is otherwise then undesirable effects occur. For example, if it were four field periods then an input signal would be compared with one corresponding to four fields previously. Assuming motion to occur so that an object occupies positions 1, 2, 3 etc. on fields 1, 2, 3 etc. respectively, then positions 1, 5, 9 etc. would be flagged on fields 1, 5, 9 etc. and so on. This would mean that there would be a four-field periodicity in the display of the track of the object, with a display of positions 1, 5, 9 etc. followed by 2, 6, 10 etc. then 3, 7, 11 etc. and finally 4, 8, 12 etc. The overall effect would be very disturbing. In particular if the delay were one picture period (i.e. two fields of the interlaced television signal), the even positions would be displayed on the even fields and the odd positions on the odd fields. This would give rise to a severe picture-frequency flicker, which is very noticeable.

Figure 3:
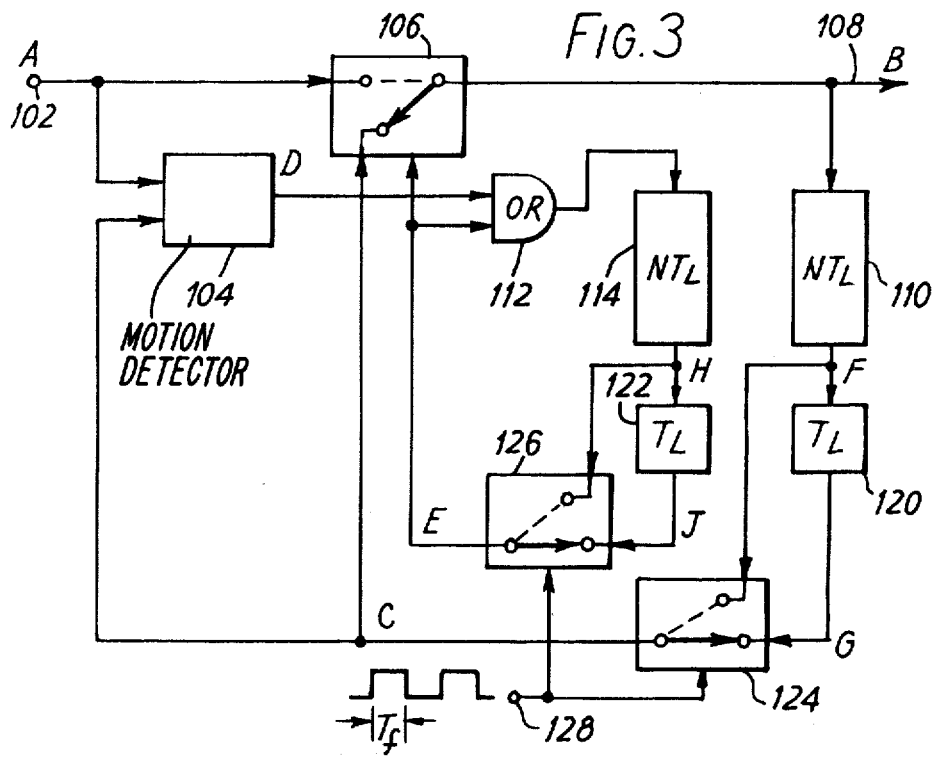
FIG. 3 illustrates how the apparatus of FIG. 1 is adapted to accommodate the difference in the number of lines in the odd and even fields of a television signal.

Given that the delay must be approximately one field period it must, in the simplest case, alternate between $NT_L$ and $(N+1)T_L$ where $T_L$ is the line period and a picture contains $2N+1$ lines. This can be done by switching in and out of circuit extra one-line delays 120 and 122 using switches 124 and 126 respectively, which change over every field, as shown in FIG. 3, in response to a signal at an input 128.

Figure 4:
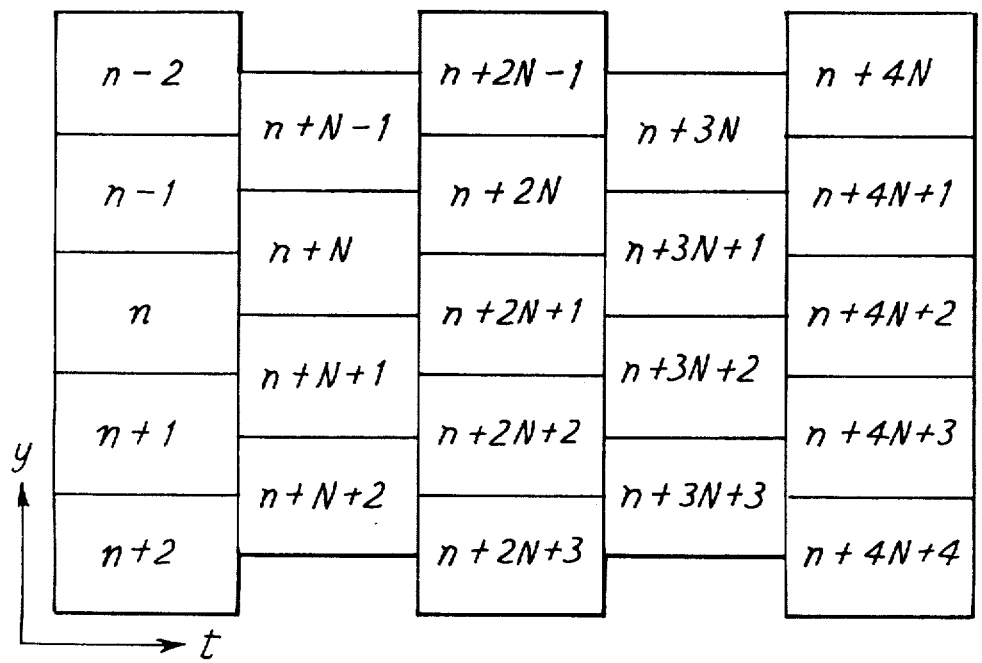
FIG. 4 defines a line numbering convention.
Figures 5, 6:
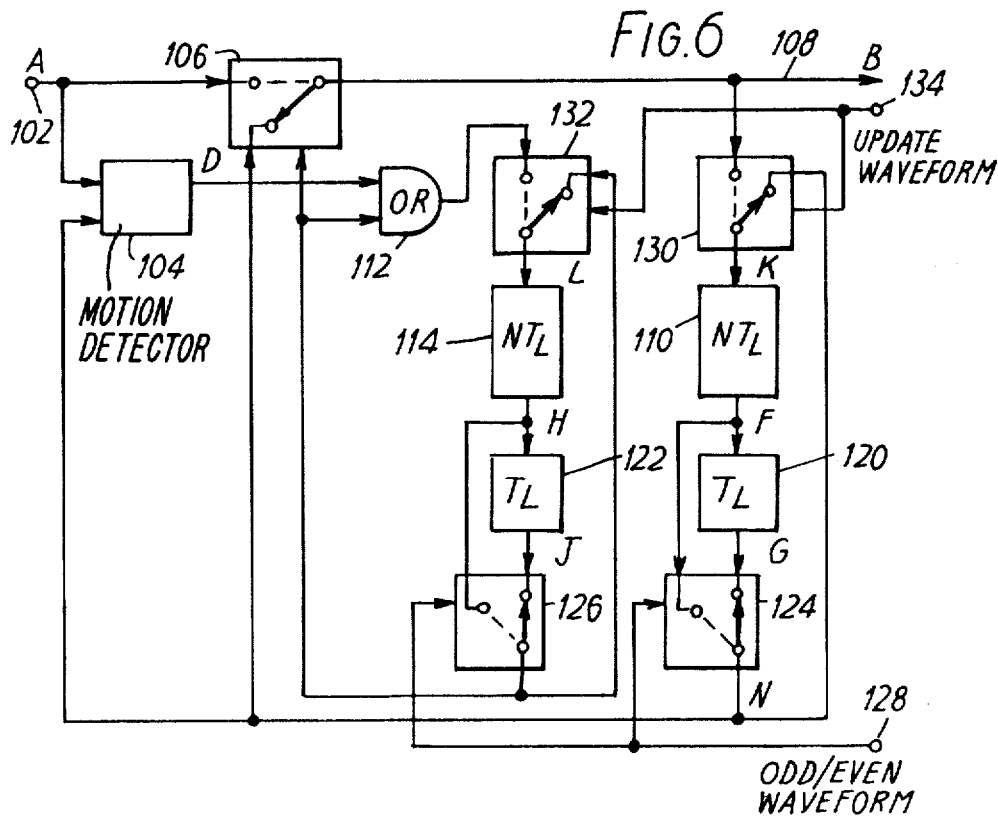
FIG. 5 shows the line numbers at various points in the circuit of FIG. 3.
FIG. 6 shows a modification in which the image position is shown for only selected fields.

To show that this works the keying-in of a particular line of information will be considered. FIG. 4 defines a convention for line numbering, and FIG. 5 shows the line numbers in terms of this convention at the points A to J in the circuit of FIG. 3 for various special occasions. The field containing line n is arbitrarily designated as an even field, and it is assumed that switches 124 and 126 select F and H respectively on even fields (see FIG. 3). Suppose that a significant new difference is detected when line n+N is at the input A, and line n−1 is at point C. As this is a new difference, line n+N is transmitted but a flag enters delay 114. After a further N lines the flag emerges at H and keys in the line n+N when line n+2N is the input and switch 124 selects F. Thereafter it is further keyed in when the input is lines n+3N+1, n+4N+1 etc., and it can be seen from FIG. 4 that these keying instants correspond to spatial positions that are either coincident with line n+N or one picture line above it.

If information belonging to an even field had been keyed in, it would have been displayed either coincident with its position or one picture line below. This repetition of keyed information on both fields introduces distortion into the displayed image which appears as serrations on sloping edges and "aliasing" of vertical detail. Moreover, if there is excessive vertical detail in the background, the vertical displacement of the signal C relative to that at A (which is always one picture line) may cause the motion detector 104 to sense motion even on stationary scenes. These effects can be mitigated by interpolation, as described below.

It will be appreciated that the delays 110, 114, 120 and 122 can be realised digitally using shaft registers or random access memories (RAMs). If RAMs are used the switches 124 and 126 are only notional, as the variation of delay can be achieved simply by perturbing the read address sequence of the RAMs.

The effect of the apparatus described so far is to display fixed images corresponding to intervals of one field period. Given the effect of camera integration, the multiple images will overlap somewhat and may not produce such an artistically desirable effect as if they were more separated. So, in general, the requirement is for fixed images corresponding to intervals of several field periods. This can be achieved by renewing the contents of delays 110, 114, 120 and 122 at the selected intervals and recirculating the contents at all other times. Then, only the wanted picture material is stored, and the picture material and the flags it creates on the intermediate fields are ignored. The recirculation requires further switches 130 and 132 which are operated at the required updating rate as shown in FIG. 6. Switch 130 is connected at the input to delay 110 so as to supply either the signal at output 108 or the signal at the output of switch 124, as determined by a signal at an input 134. Switch 132 likewise selects either the signal from gate 112 or the signal from switch 126. Thus, the delays can be connected either in a recirculating mode, or to the output as in FIG. 3. Because the recirculation is taken from points C and E the alternation of delay caused by switches 124 and 126 ensures correct picture periodicity of the recirculating information.

As before, if delays 110, 114, 120 and 122 are realised by using RAMs, the switches 130 and 132 are again notional, as it is only necessary to disable the writing process to ensure that the store contents are fixed. The update waveform then becomes the write enable waveform. However, the switches will continue to be shown and described as such, for ease of understanding.

As mentioned earlier, the fact that the signal at C is vertically displaced by one picture line from the signal at A upsets the action of the motion detector 104 and keys-in impaired images where there is excessive vertical detail. Generally this is not a serious problem, but it can be reduced.

The situation can be improved by interpolating the information stored in the field or image store to obtain a more accurate estimate of the information on the current scan. This interpolation can never be perfect if there is vertical detail beyond $\frac{1}{2}$N cycles/picture height, but nevertheless it makes an improvement. Referring to FIG. 4, the simplest case is to take the mean of lines n and n−1 as the estimate of line n+N Thus, taking the simple arrangement of FIG. 3, the switch 124 is replaced by a halving adder or averager. However, this in itself is not enough, because although it provides a better estimation of the current scan for the motion detector 104, the information which is keyed-in passes through the averager on each field. This produces successive corruption of the keyed information by repeated averaging, and vertical definition is lost.

Figure 7:
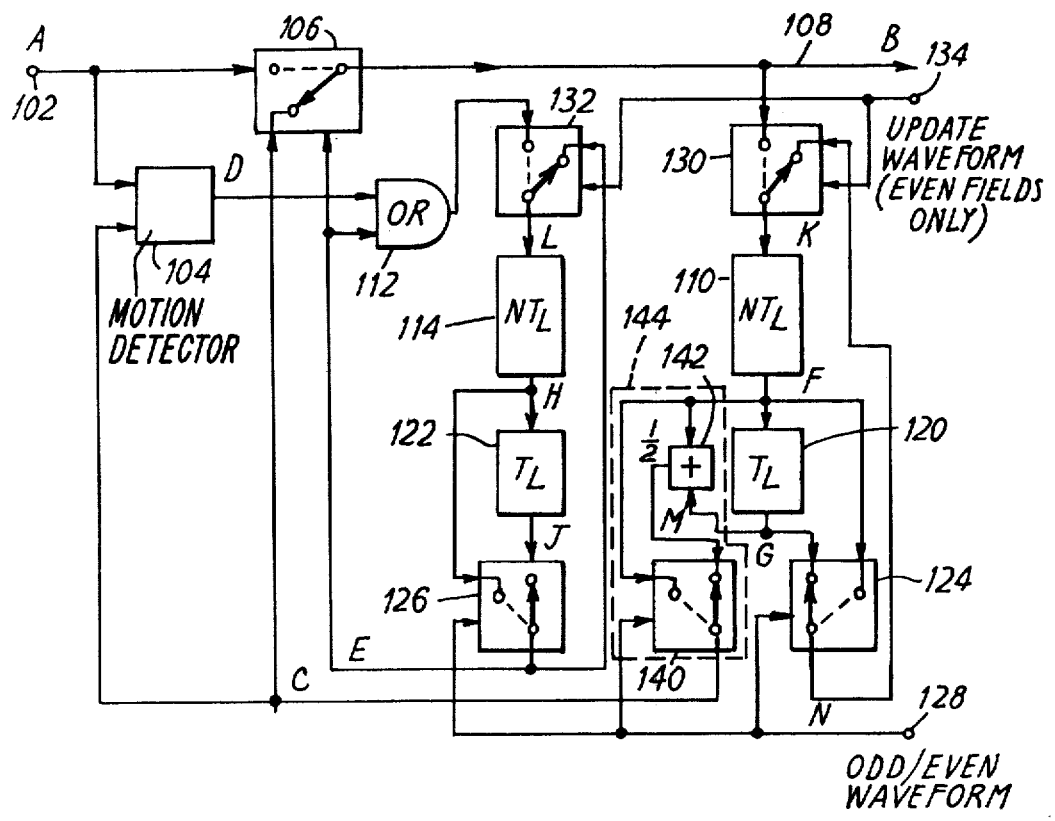
FIG. 7 is a block circuit diagram of a modification of FIG. 6 in which only alternate fields are used in updating.

The problem can be solved in two ways. Firstly the update period can be confined to an even number of fields using the arrangement of FIG. 7. Suppose that only even fields are written into the delays, with recirculation occurring at all other times, via the loop KFNK or KFGNK as in FIG. 6. The averager is now unnecessary when the input is an even field and so switch 140 performs the function of bypassing the averager 142 on even fields. The switch 140 and averager 142 can be regarded as a predictor, predicting the correct type of information to compare with, and substitute for, the incoming field. Suppose we designate the bypass and averaging states as 0 and 1 respectively. Then, when the stores are updated, the predictor 144 is always in state 9 and the keyed information recirculates via the loop KFCBK, which does not corrupt. In FIG. 7, the switches 124, 126 and 140 are shown in the states appropriate to an odd field input. The arrangement works equally well if only odd fields are written into the stores, provided that switch 140 selects the bypass on the odd fields and either switches 124 and 126 select the shorter path on the odd fields, or switches 124 and 126 select the longer path on the odd fields and the bypass for switch 140 is taken from G instead of F. It can therefore be seen that the arrangement is specifically dedicated to either odd or even field updating.

As before, if RAMs are used, the switches 124, 126, 130 and 132 are only notional, but delay 120 must be external to the memory to provide simultaneous access to points F and G for the predictor, unless the memory can provide the required two outputs simultaneously.

Figure 8:
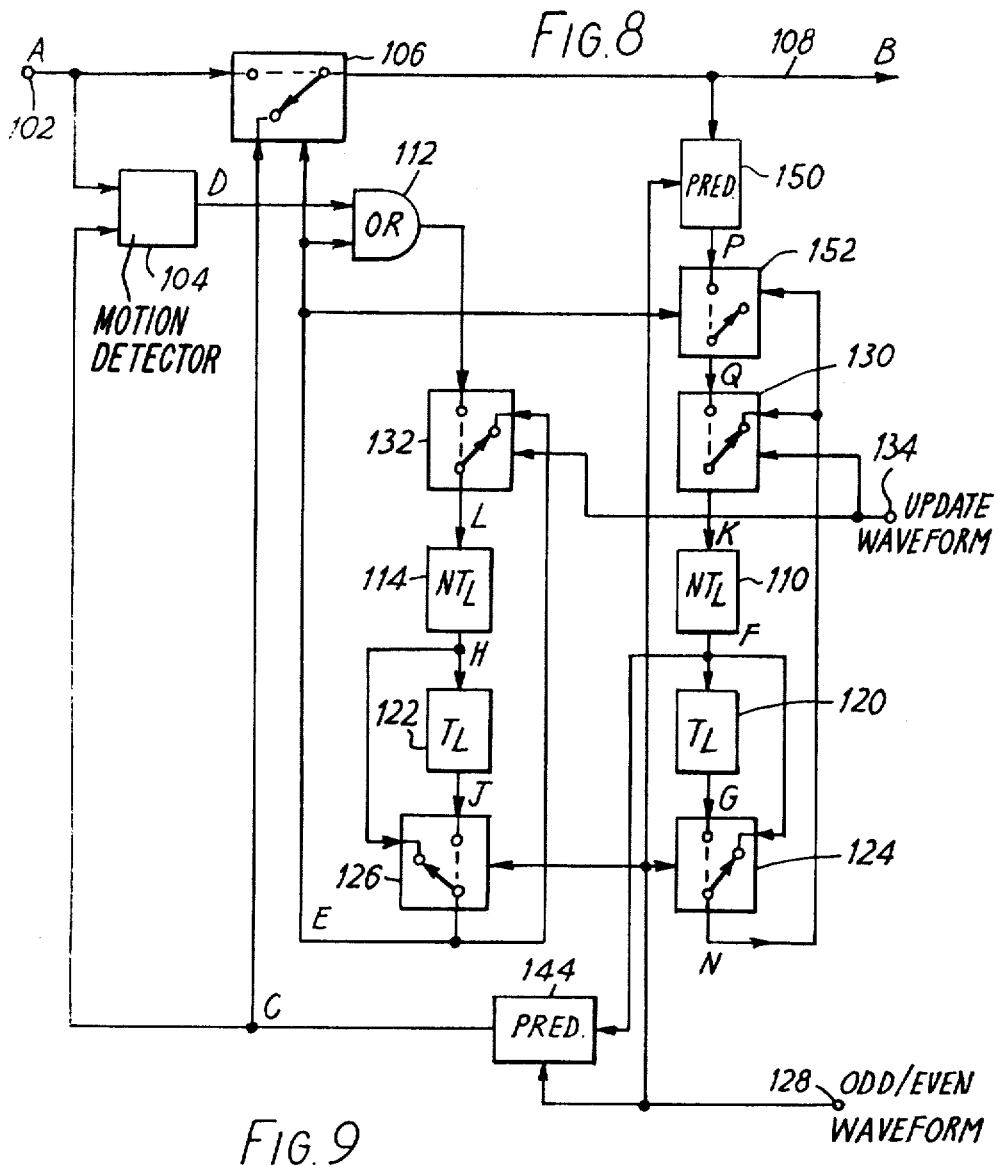
FIG. 8 is a block circuit diagram of a modification of FIG. 6 in which interpolation between adjacent lines is provided.
Figure 9:
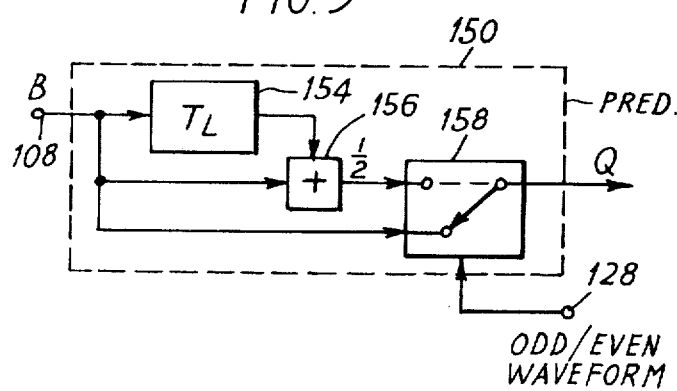
FIG. 9 shows a predictor for use in the circuit of FIG. 8 to ensure that the stored field is always of one type.

If updating on either kind of field is required, it is necessary to introduce a further 2-state predictor 150 and recirculating switch 152 before the store 110 and its recirculating switch 130, as shown in FIG. 8. The circuit of the predictor 150 which is similar to that of the predictor 144 to FIG. 7, is shown to FIG. 9. Thus, the predictor 150 comprises a one line delay 154, a halving adder or averager 156 connected across the delay 154, and a switch 158, able to select either the output of the averager 156 or the circuit output 108 in accordance with the control signal at input 128. The purpose of predictor 150 is to ensure that the stored information always belongs to fields of one type. Switch 152 which is operated by the keying signal from switch 126, prevents keyed information from entering the store 110 via predictor 150 during updating, and ensures that it is recirculated instead, thus avoiding progressive corruption.

Let us arbitrarily suppose that the state 0 of predictor 144 corresponding to the bypass condition, occurs on even fields. With the predictor circuit as shown, this implies that switches 124 and 126 select the shorter path on even fields, as shown in FIG. 8. Then information belonging to even fields is stored unchanged but odd-field information is once-predicted. The loop timings ensure that when keying occurs the keyed information is displayed in the correct vertical place. However, the image definition varies according to source and display conditions as shown in the Table below because of the varying number of predictors the signal has passed through. The worst case of twice-predicted is still better than, say, ten or twenty predictions, necessary to build up an adequate object track. Thus the successive corruption has been avoided.

TABLE

|  |  | Source Field | |
|---|---|---|---|
|  |  | Even | Odd |
| Display Field | Even | unimpaired | once-predicted |
|  | Odd | once-predicted | twice-predicted |

If a RAM store is used, the switch 152 may be notional if it is possible to inhibit the RAM updating at the speed of the keying signal.

For operation with composite colour signals the incoming signal can first be decoded into luminance and two colour-difference signals which may then be processed by individual circuits of the form of FIGS. 3, 6, 7 or 8. To improve the sensitivity to moving objects the keying circuits of the three processors can be linked together by extending the gate 112 of each circuit to take feeds from the other two motion detector signals. Finally the three signals can be recoded to form a composite signal.

Alternatively the composite signal need not be decoded and recoded provided that suitable circuitry is provided to allow for the inherent field-to-field difference of the modulated colour information. This has the advantage of needing only one image store 110. This circuitry can take the form of a predictor circuit having several states, one for each field, which is able to make an estimate of the current field signal using information belonging to an earlier field. A predictor for NTSC composite signals has 4 stages while one for PAL composite signals has 8 states. A suitable predictor for PAL System I signals is described in our copending application Ser. No. 43,540 claiming priority from British Patent application No. 23925/78, to which reference should be made.

Figure 10:
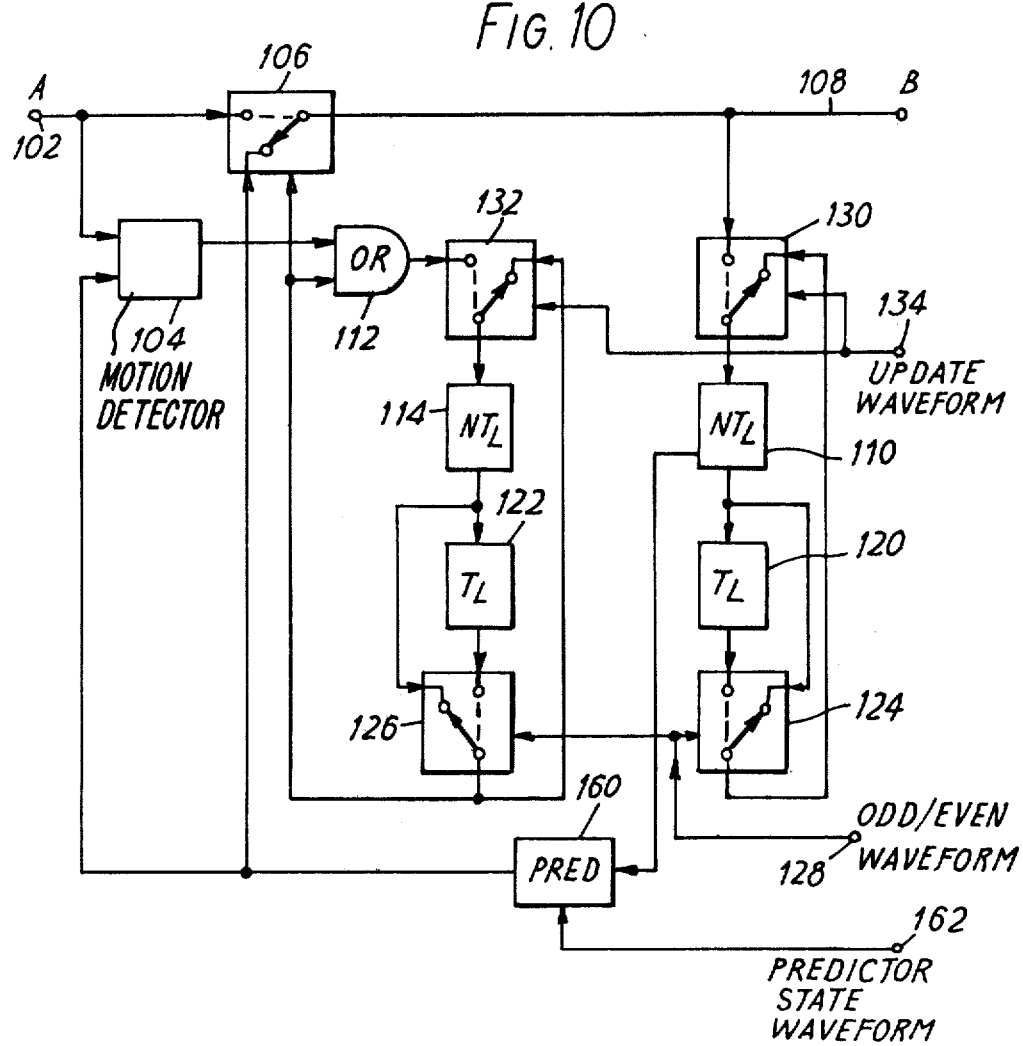
FIG. 10 is a block circuit diagram of a circuit for use with composite PAL colour signals.
Figure 11:
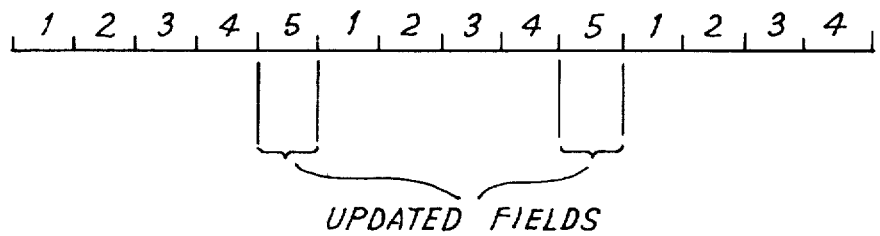
FIG. 11 illustrates the updating of fields in the arrangement of FIG. 10.

A circuit for dealing with composite PAL colour signals is shown in FIG. 10. This is analogous to FIG. 7 except that the predictor-state waveform is not, in general, a simple two-state waveform. The predictor-state waveform is required to cycle through its states until the contents of store 110 are updated, as shown in FIG. 110. On the next field the predictor must revert to state 1, i.e. prediction from the previous field. In general, it can be seen that the predictor is always in state n' when updating occurs, where n' equals modulo 4n or modulo 8n, and the updating period is n fields.

In this arrangement the keyed information is written into the store 110 via a predictor 160 every time the store is updated. This predictor is as described in the aforementioned application. Successive corruption occurs, as mentioned earlier, unless the prediction is perfect. The exception occurs if the updating period is a multiple of 4 for NTSC signals or 8 fields for PAL signals, for then the predictor 160 is always in state 0 when store 110 is updated, and no corruption takes place.

Figure 12:
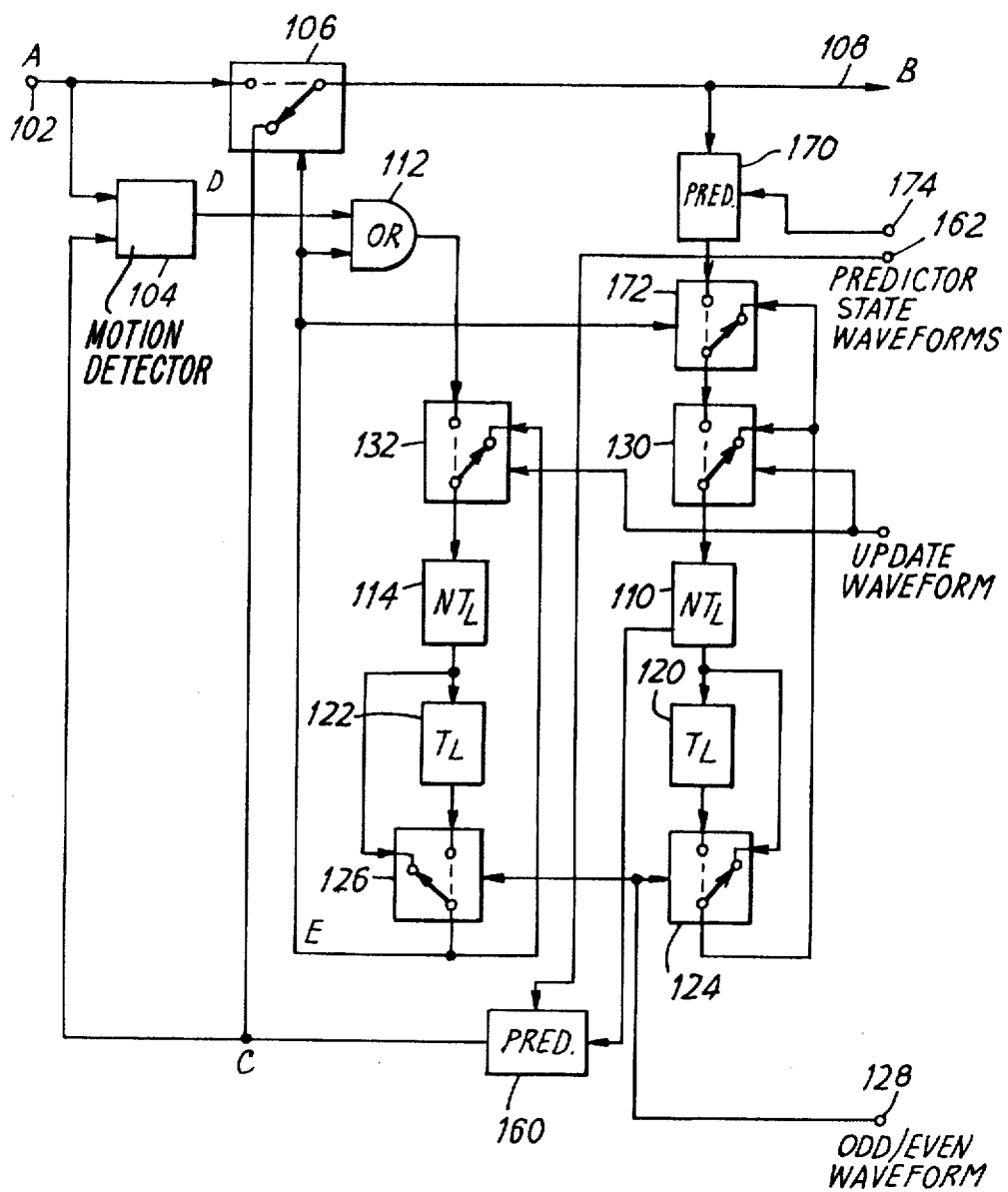
FIG. 12 illustrates a modification of the circuit of FIG. 10 in which the predictors are arranged such as to avoid successive corruption of the data.

This difficulty can be overcome by using a second predictor 170 and auxilairy means for recirculating keyed information using a switch 172 as shown in FIG. 12. This is analogous to FIG. 8, adapted for colour signals, except for the separation of predictor-state and odd/even waveforms. The function of predictor 170 is to ensure that all the stored information is transformed to one field of the 4-field or 8-field cycle as the case may be. Likewise the function of predictor 160 is to transform the stored information into the form appropriate to the current scan. As such, the state cycle of predictor 170 rotates in the opposite direction from that of predictor 160. For example, if we arbitrarily designate the stored information as being of field 0 form, then when the input is of field 3 form predictor 170 performs a 3 to 0 transformation and predictor 160 performs a 0 to 3 transformation. These transformations do not exactly cancel to produce unimpaired information.

The state cycles of the two predictors are now unaffected by the updating waveform and are never reset. As in FIG. 8, the switch 172 prevents the keyed information from entering store 110 via predictor 170, and ensures that it is recirculated without further corruption. Thus, the displayed keyed information always passes only once through predictors 170 and 160. In this way, successive corruption is avoided, whilst allowing an updating period of any number of fields.

It is possible to make the tracks decay as they are formed. In this way the decay of the oldest part at any instant will be more advanced than that of the newest part. This facility may be useful where the existence of many tracks may be confusing.

Figure 13:
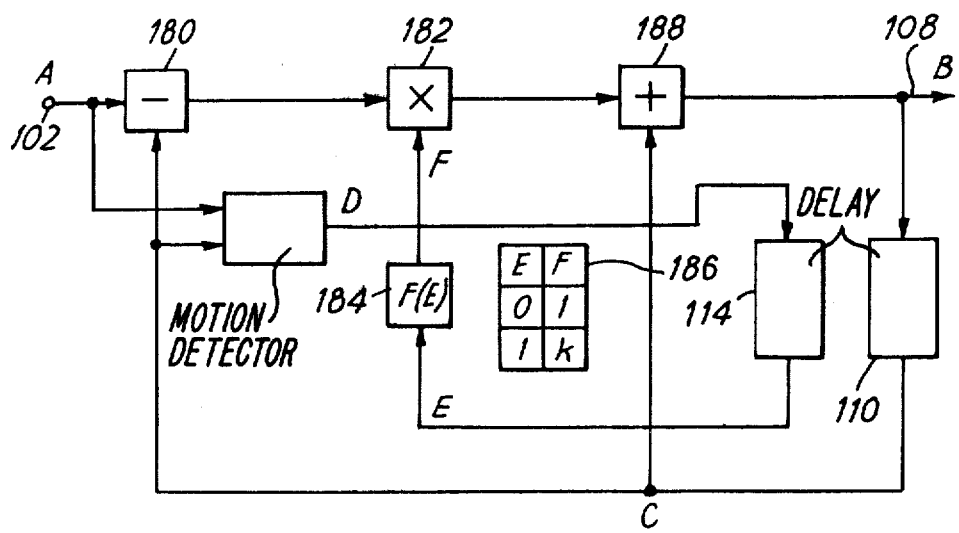
FIG. 13 shows a modification of FIG. 1 which permits image decay.

Reverting to FIG. 1 the circuit may be modified to that of FIG. 13. In this circuit, the selector switch 106 has been removed, as has the OR gate 112. A subtractor 180 is connected to the input 102 and receives the output of delay 110 at its inverting input. A multiplier 182 receives the outputs of the subtractor 180 and of a function generator 184, which operates as illustrated in the table 186. An adder 188 adds the outputs of the multiplier 182 and the delay 110 to provide the output signal 108. As before, the output of the motion detector 104 is a two-state signal which is used to flag field-to-field differences. When the flag occurs it is used in function generator 184 to produce a multiplier value, k, which is less than unity, and which is applied to one input of the multiplier 182. The effect of subtractor 180, multiplier 182 and adder 188 is to produce, whenever the flag occurs, an output signal B equal to k times the input signal plus (1−k) times the output signal for the previous field.

If k is vey small, this keyed-in signal is nearly as large as it was on the previous field and it decays very slowy. Each time it is keyed-in, its subsequent appearance at C is sensed by the motion detector and thus the flag signal is regenerated. When it has decayed sufficiently, however, the flag signal is no longer generated and the keyed-in signal suddenly disappears. If the gate 112 in FIG. 1 were included in the arrangement of FIG. 13 this does not happen but the continued existence of the flag signal prevents overwriting with fresh information in those places where the decayed track existed. For this reason it is preferable to omit gate 112. This aspect can be combined with any of the arrangements of FIGS. 3, 6, 7, 8, 10 and 12.

It is possible to freeze the displayed picture after the track has developed to a suitable point by overriding the flag signal with a permanent flag. This causes switch 106 to select C for the whole picture, and thus recirculate the information stored in store 110. To avoid progressive corruption in arrangements where there is only one predictor, the store 110 must also be prevented from updating, and the predictor phase not reset. With this proviso this feature can be used with any of the arrangements of FIGS. 3, 6, 7, 8, 10, 12 and 13.

Figure 14:
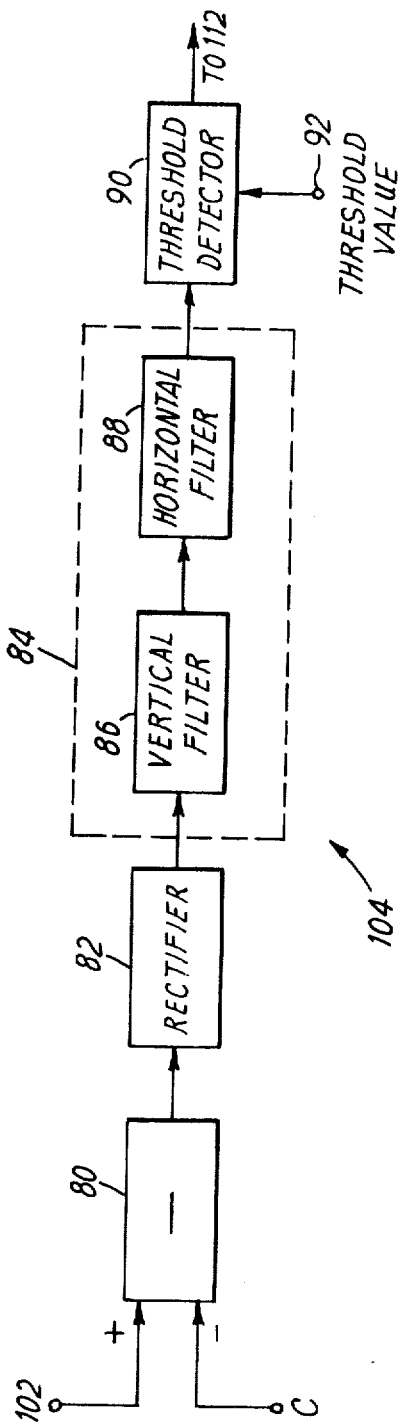
FIG. 14 is a block diagram of the motion detector.

In all the various embodiments described, the motion detector can comprise a subtractor, rectifier and lowpass filter similar to the components 12, 100 and 22 of our British Patent application No. 9537/77, (see German Offenlegungsschrift 2809216) and may include also other components of the function generator side chain described in that application and our British Patent application No. 12972/78 (see European Patent application 79300450.8) A suitable motion detector is illustrated in FIG. 14. The detector takes feeds of the current input signal from input 102 and the reference signal from point C which are applied to a subtractor 80.

The subtractor 80 provides an output signal equal to the difference between the current input signal and the reference signal provided from the image store 110. In stationary areas of the picture, the subtractor output will still not, in general, be zero, since it corresponds to the positive or negative difference between the uncorrelated noise content of the two subtractor input signals. In the areas of picture that a moving object has just left or has newly occupied, the subtractor output will contain an additional component. This additional component may be positive, negative or may have positive and negative values in different parts of the picture. The subtractor output could therefore be rectified and applied to a threshold detector to give an indication of when the instantaneous picture difference is large. Such a system alone would not give a very satisfactory movement detection because the subtractor output may have such a high variance that the instantaneous value of the rectifier output may occasionally be small or even zero during movement. The movement detector will therefore be disturbed by noise and detail in the moving object and background.

This problem may be overcome by exploiting the fact that the rectifier output will have an increased mean value during movement. Accordingly the circuit includes a rectifier 82, a spatial filter unit 84, and a threshold detector 90 connected in series. The spatial filter 84 takes an equally-weighted sum of the rectifier output samples in the area surrounding the point of interest, thereby deriving a 'mean' value. The operation of adding together spatially displaced samples is equivalent to a transversal filter. The one shown in FIG. 14 has a vertical filter 86 and a horizontal filter 88 and adds samples with equal weights, giving a (sin x)/x lowpass frequency characteristic both vertically and horizontally. Other types of lowpass filter could be used, and can be realised either as cascaded vertical and horizontal lowpass filters or as a combined 'spatial filter'.

The effect of the filer is twofold. Firstly, it reduces the variance of the signal being fed to the threshold device and, secondly, it gives a slowly changing signal which begins to increase in the area surrounding the moving object. The threshold control input 92 to the threshold detector 90 can therefore be adjusted to give a definite indication of movement in an area which totally contains the moving object.

The number of rectifier output samples used by the spatial filter 84 determines the minimum size of moving object that can be successfully detected. The smaller the object, the fewer the number of terms that should be used. The choice of the filter must be a compromise between sensitivity to small moving objects and smoothness of operation in the presence of noise and detail in the current input and reference signals.

A filter which takes equal weights over five field lines vertically and fifteen samples horizontally has been found to be a good compromise, giving the movement detector an overall delay of just over 2 lines.

Figure 15:
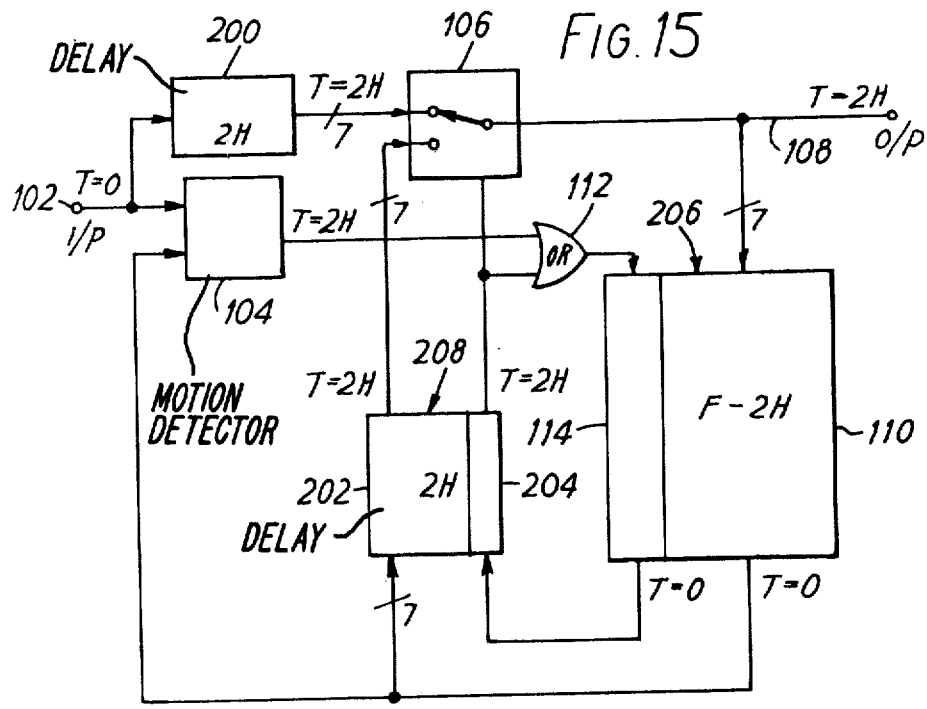
FIG. 15 illustrates the compensation of delays in the circuit of FIG. 1.

The motion detector 104 will normally introduce a timing delay and typically this is two line periods. This timing delay must be equalised throughout the circuit and FIG. 15 illustrates one way this may be done. FIG. 15 is based on FIG. 1 but a two-line delay 200 is included between the input 102 and the switch 106. The delays 110 and 114 are each shortened by two lines so as to be equal to (F-2H) where F and H are one field and line period respectively. The two lines are made up in the recirculating loop by additional delays 202 and 204 connected at the second data and control inputs of switch 106.

FIG. 15 shows the delays 110 and 114 as combined into a single unit 206. This is done by substituting the flag for the least significant bit of the image data. Similarly, delays 202 and 204 are combined into a single unit 208.

Figure 16:
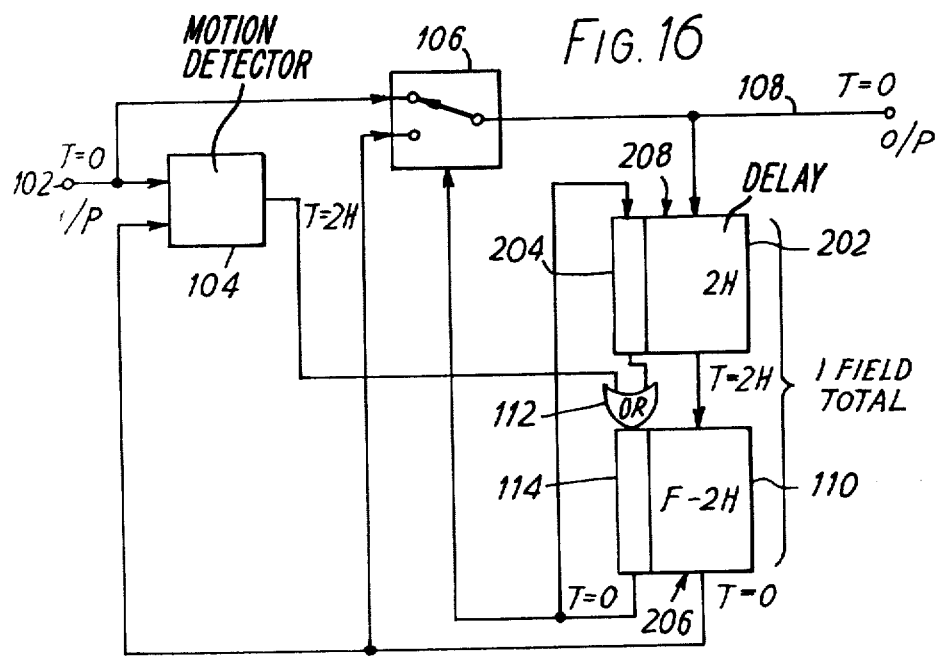
FIG. 16 shows an improved arrangement of the circuit of FIG. 15.

FIG. 16 shows a more economical arrangement in which the unit 208 is repositioned at the input to unit 206, so that delay 200 can be omitted and the overall delay between input and output reduced. It should be noted that the output of the movement detector 104 is applied through OR gate 112 directly into delay unit 206.

Figure 17:
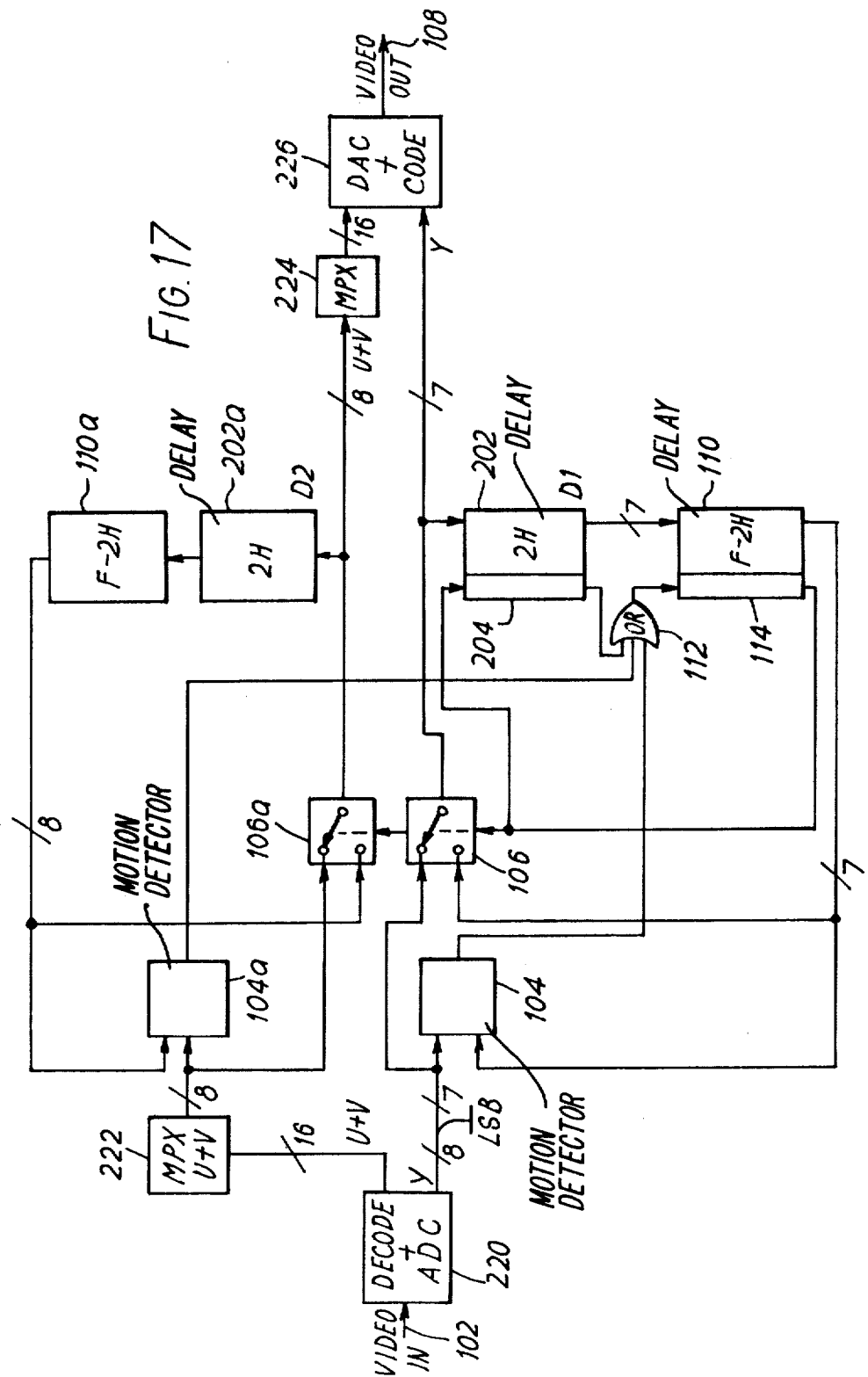
FIG. 17 is a block diagram of an embodiment in which the colour television signal is decoded into luminance and chrominance signals.

FIG. 17 illustrates a system based on FIG. 16 and designed for use with colour television signals in which the signals are decoded into a luminance signal and a chrominance signal. To this end a PAL decoder combined with an analogue to digital converter 220 is connected to the input 102 and supplies two outputs. The luminance output is applied to a circuit essentially identical to FIG. 16. The chrominance output is applied to a multiplexer 222 which forms the U and V signals into 8-bit form, and the multiplexer output is applied to another motion detector 104a, having an associated switch 106a, and delays 110a and 202a. The output of motion detector 104a is applied as an additional input to OR gate 112.

Thus, movement given by changes of brightness or colour are separately detected and the results combined. Note that only one flag store is required. The output of switch 106a is reformed into 16 bit format in a multiplexer 224 and then applied to a digital-to-analogue converter combined with a PAL coder in a unit 226 to provide the output 108.

Figure 18:
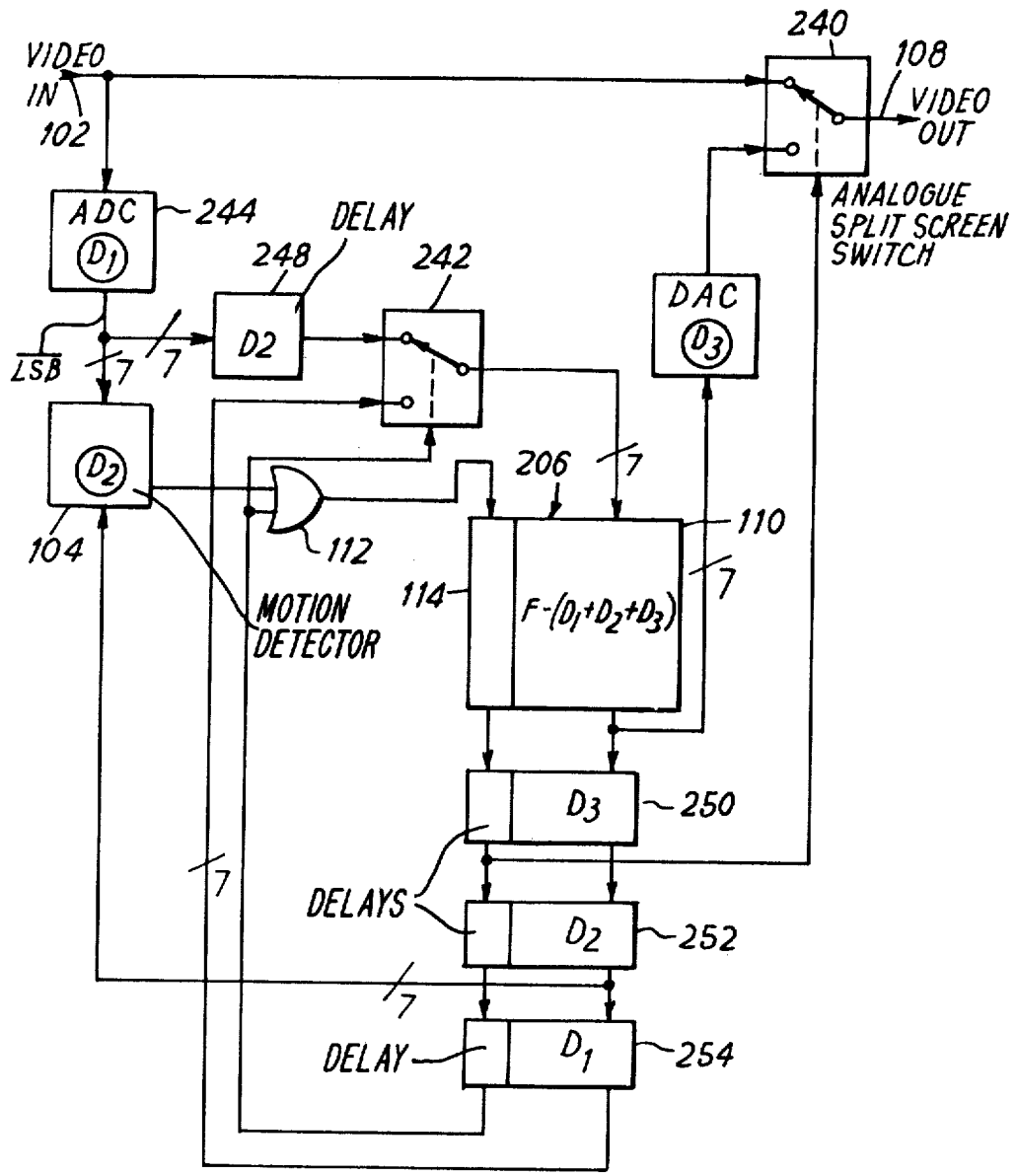
FIG. 18 shows a variant using an analogue split screen switch to combine the images.

FIG. 18 shows a circuit incorporating an analogue split screen switch 240 to effect the image mixing. It is essential for this for the delays to be properly equalised. To do this the switch 106 is replaced by two switches, namely the analogue switch 240 and a switch 242, which operate in precisely the same way with a delay between them to compensate for the combined delay introduced by the movement detector 104 and an analogue-to-digital converter 244, these introducing delays D2 and D1 respectively. Compensation is also provided for the delay D3 introduced by a digital-to-analgoue converter 246. In view of the preceding description the measures taken will be apparent from FIG. 18, and include the provision of a two line delay 248 in the path between the ADC 244 and the switch 242, and three delays 250, 252 and 254 at the output of delay unit 206. The total delay of units 206, 250, 252 and 254 is one field. Delay 250 compensates for the delay of DAC 246, delay 252 for that of the ADC 244, and delay 254 for that of the movement detector 104.

The systems described above display the path of moving objects by showing a superposition of their images at selected, usually uniformly spaced, instants of time. The instant spacing will normally be dependent on the speed of movement of the objects and will require to be adjusted to obtain the best artistic effect. A further requirement is that the completed path should be capable of display with or without the background, for as long as desired, i.e. a "freeze" presentation.

It should be noted that elements act like delay lines. If such a device is to store a signal it requires a means of recirculating its information. Thus, such circuit elements are provided with input switches which select either a free input or the delay output. Such a model is convenient as it gives a clear indication of signal timings but in practice such a circuit function is now carried out by random access memories (RAMs). These can store information indefinitely if suitably operated and can be arranged to behave as a delay by suitable choice of write and read address sequences.

In the following descriptions a delay element designated F will represent a nominal field delay alternating in length between N and N+1 line periods where there are 2N+1 lines per picture (cf. FIG. 3). In all arrangements images are stored on a field-by-field rather than a picture-by-picture basis. The consequences for spurious movement detection caused by interlace error are not thought to be serious.

Figure 19:
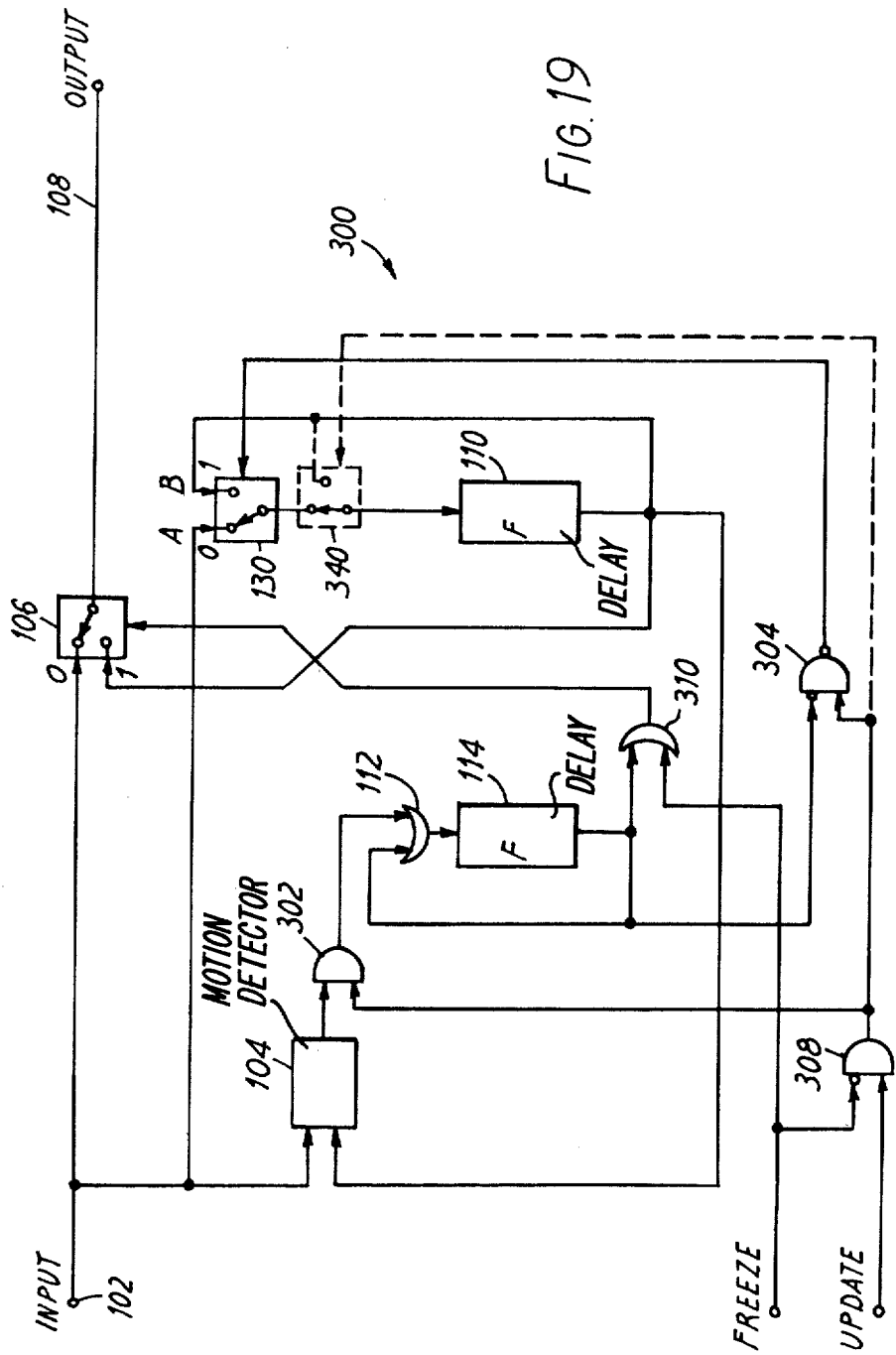
FIG. 19 shows an embodiment in which a freeze presentation may be obtained.

FIG. 19 shows a slight rearrangement 300 of the basic circuit of FIG. 6. An update gate 302 replaces switch 132 for the flag store 114. Switch 130 is connected to the circuit input instead of the output, but functions identically. Switch 130 is operated by the flag signal gated with the update waveform in a gate 304.

In operation, differences caused by new positions create new flags which enter store 114 but do not appear during that field at the store's output. Thus, switches 106 and 130 both select the input signal. Differences caused by old positions are however accompanied by a flag at the output of store 114, thus causing switch 106 to select the output of store 110 containing the previous image. Also, store 110 recirculates its information so that it contains old keyed images and new background. A freeze signal can be applied at an input 306 to prevent updating of stores 110 and 114 via a gate 308, and overrides the flag via an OR gate 310, setting switch 106 to select the output of the image store 110. If the keyed images overlap, then only the non-overlapping part of the new image is written into store 110 because the old flag prevents the rest from being written.

Figure 20:
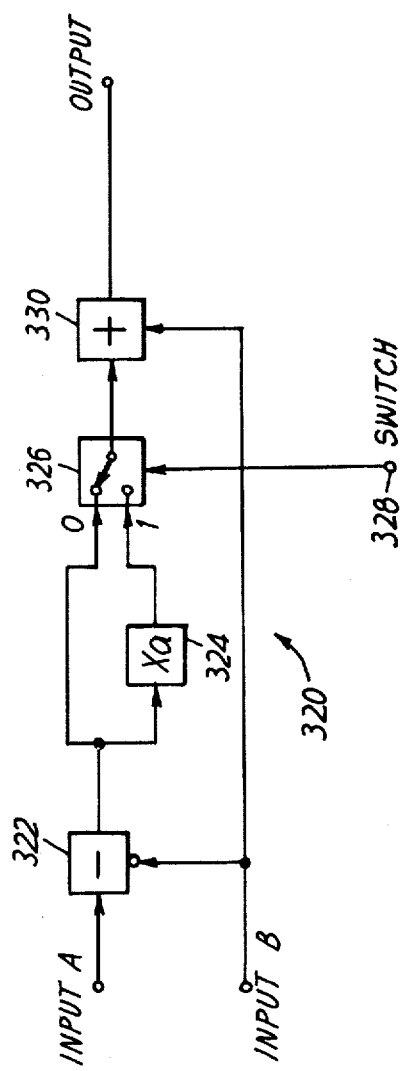
FIG. 20 shows a network which can be used in the circuit of FIG. 18 to produce image decay.

FIG. 20 shows a network 320 which can be used to replace switch 130, if decay of the old images is required. This substitution can be applied to all the ensuing circuits. The network includes an A input connected to the circuit input 102 and a B input connected to the output of delay 110. The B signal is subtracted from the A signal in a subtractor 322, and the subtractor output applied both directly and through a multiplier or attenuator 324 to a selector switch 326. Switch 326 is operated in response to a control signal at an input 328. The switch output and the B signal are again added in an adder 330. The output of network 320 is either A or aA+(1−a)B depending on a switch signal at input 328, where a is less than unity, and thus it causes the recirculating signal B to be attenuated and mixed with the background each time it passes through the network. Now a further recirculating switch 340 (FIG. 19) is needed, shown in dashed lines, to ensure that decay via the network 320 takes place only during updated fields. Otherwise the image-image decay depends on the update frequency. Switch 340 is notional and, in practice, would be effected by suspending the store write-enable except during the updated fields.

Figure 21:
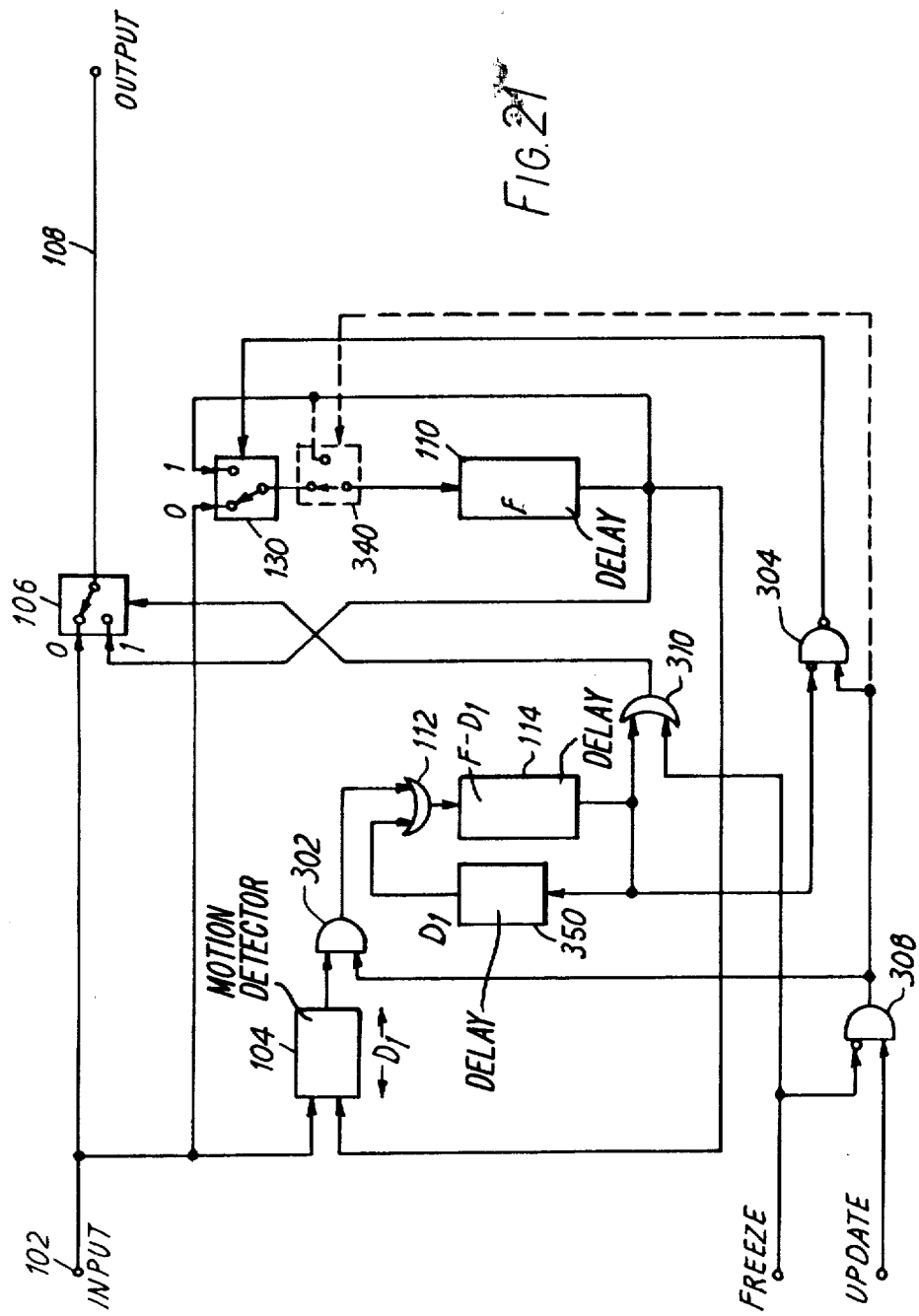
FIG. 21 shows how the circuit of FIG. 19 is modified to allow for the delay of the motion detector.

FIG. 21 is an extension of FIG. 19 to allow for the delay of the movement detector. As the flag at switches 106 and 130 must be synchronous with the input, discounting an arbitrary number of fields, the delay D1 of the movement detector 104 may be subtracted from the flag store 114. Thus, an extra delay 350 is required.

Figure 22:
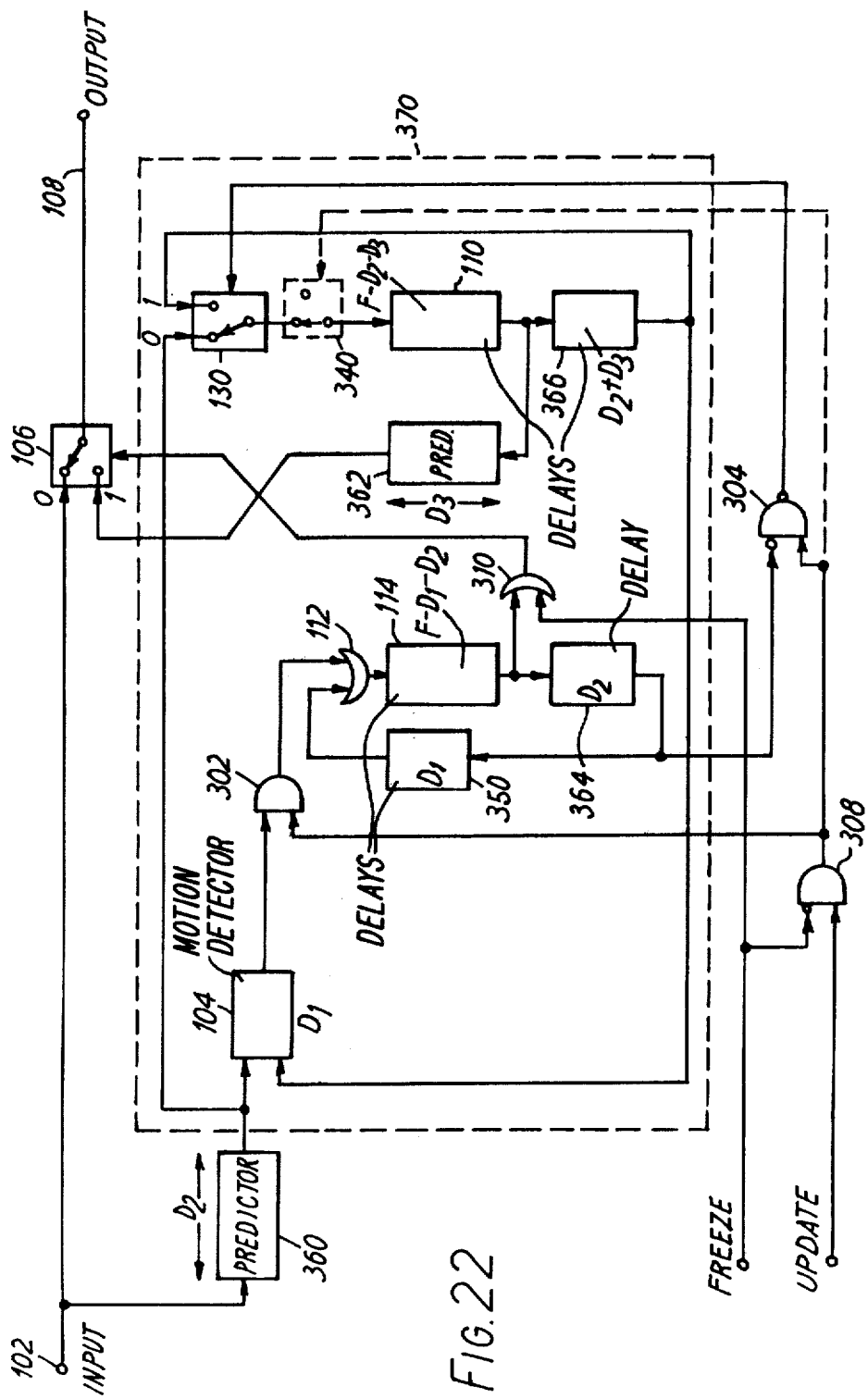
FIG. 22 illustrates an embodiment based on FIG. 21 and adapted for use with colour signals.

FIG. 22 is an extension of FIG. 21 to allow for colour operation. This is analogous to FIG. 12. Colour operation is accomplished by using two variable predictors 360, 362 operating in anti-phase as described above. Most of the circuit thus operates with a single field phase of the composite signal cycle. As before, correct timing of the flag to switch 106 allows the delay of the inverse predictor 360 to be taken out of store 114, but correct timing of the flag to switch 130 requires a further delay 364. Correct timing of keyed information at switch 106 via predictor 362 requires store 110 to be shortened by the sum of the coder and decoder or predictor delays. This requires an extra store 366. As before, switch 10 may be replaced by the network of FIG. 20. It should be noted that the delay from input to output is nominally zero, and only keyed images suffer impairment due to prediction.

In an alternative arrangement, not shown, but based on FIG. 22, the predictor 360 is replaced by a PAL decoder and the predictor 362 by a PAL coder. The circuits within the dashed box 370 are then triplicated for the three signal components Y, U and V. The output of each of the three movement detectors 104 is applied to one input of a single, 3-input OR gate (not shown) which is, in turn, connected to gate 302. The output of gate 304 also operates all three of the switches 130.

Figure 23:
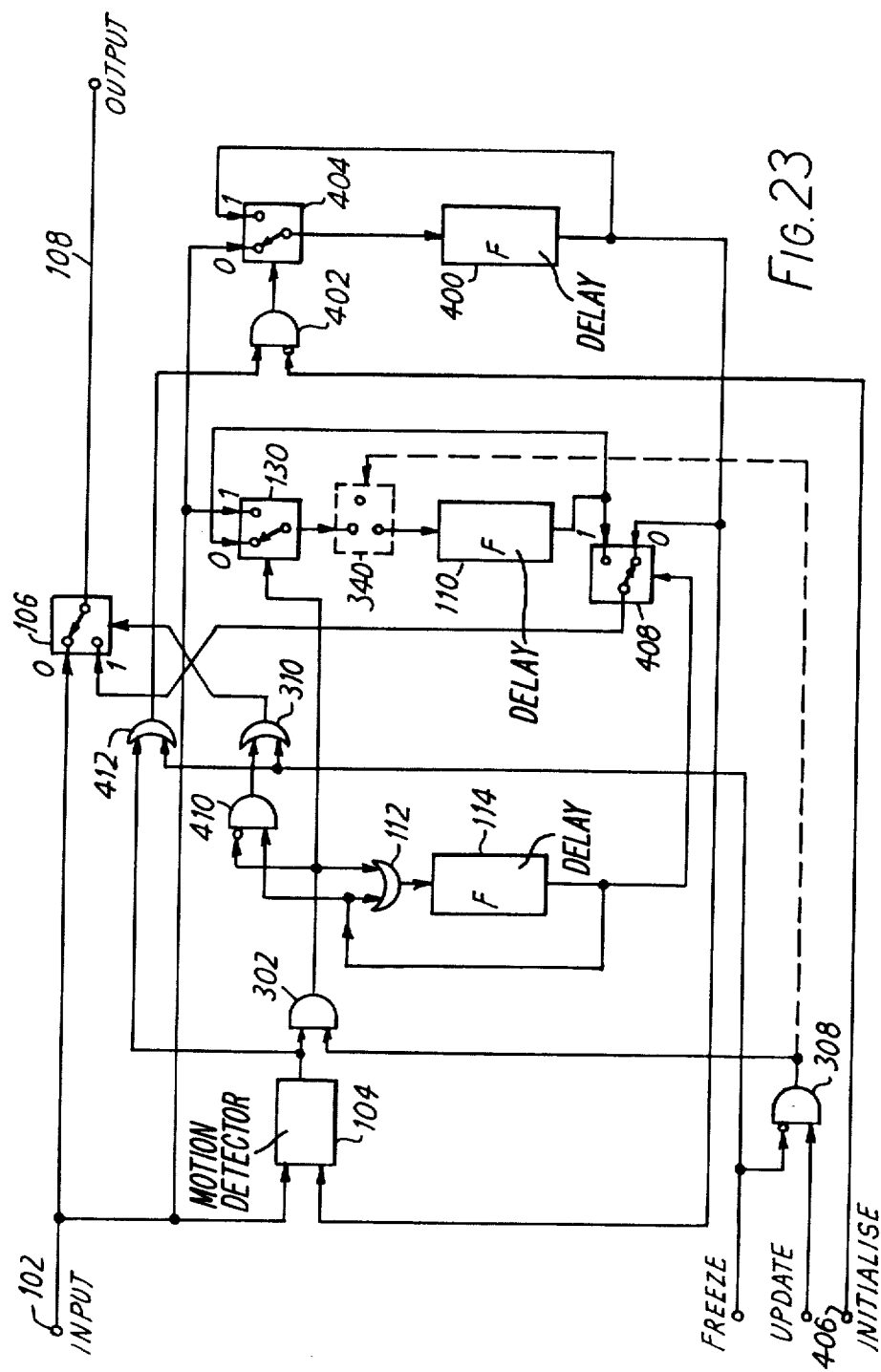
FIG. 23 is a block circuit diagram of an embodiment which uses an extra image store to achieve normal obscuring of overlapped images.
Figure 24:
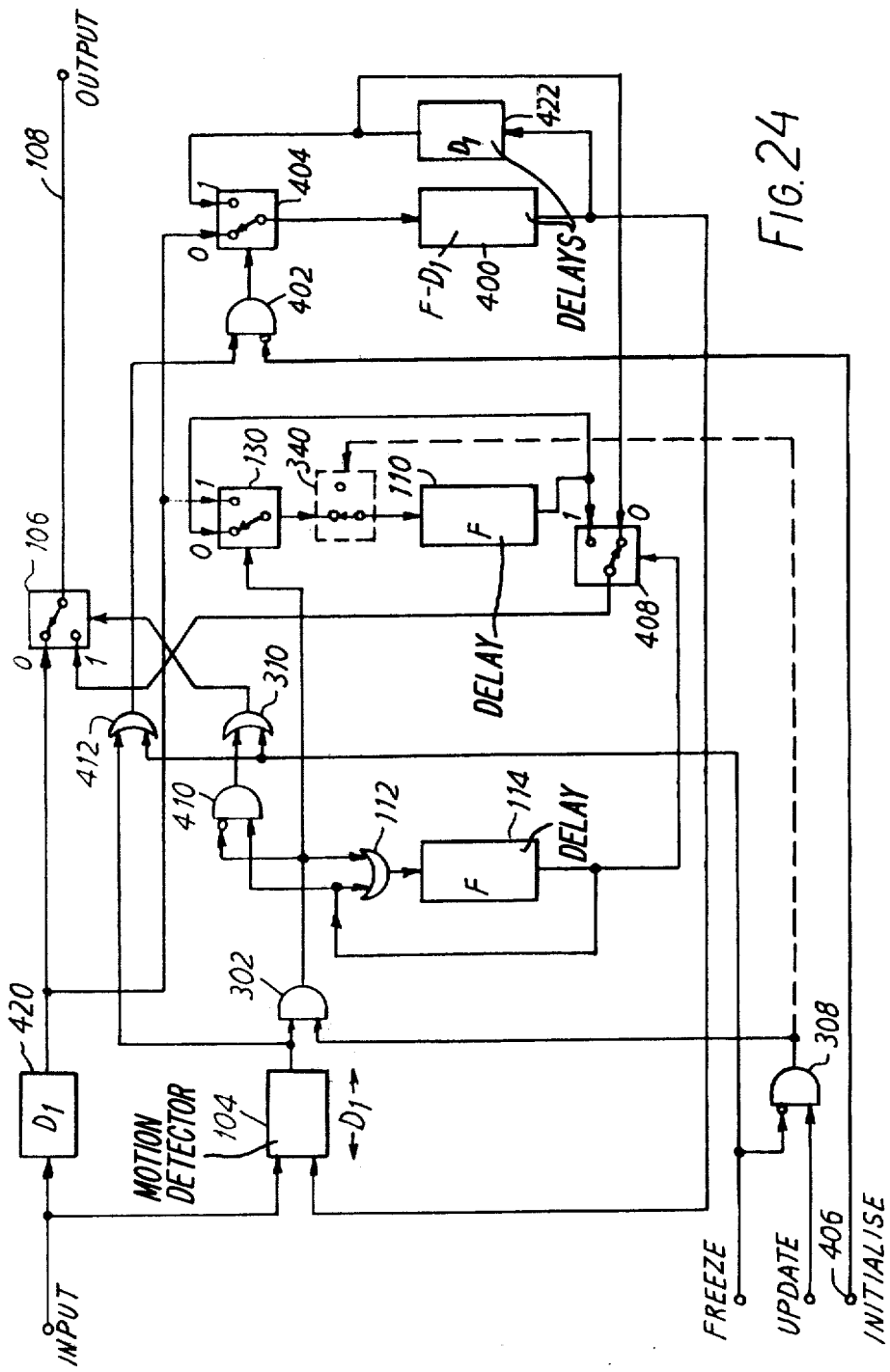
FIG. 24 illustrates how the circuit of FIG. 23 can be rearranged to allow for any delay in the movement detector.
Figure 25:
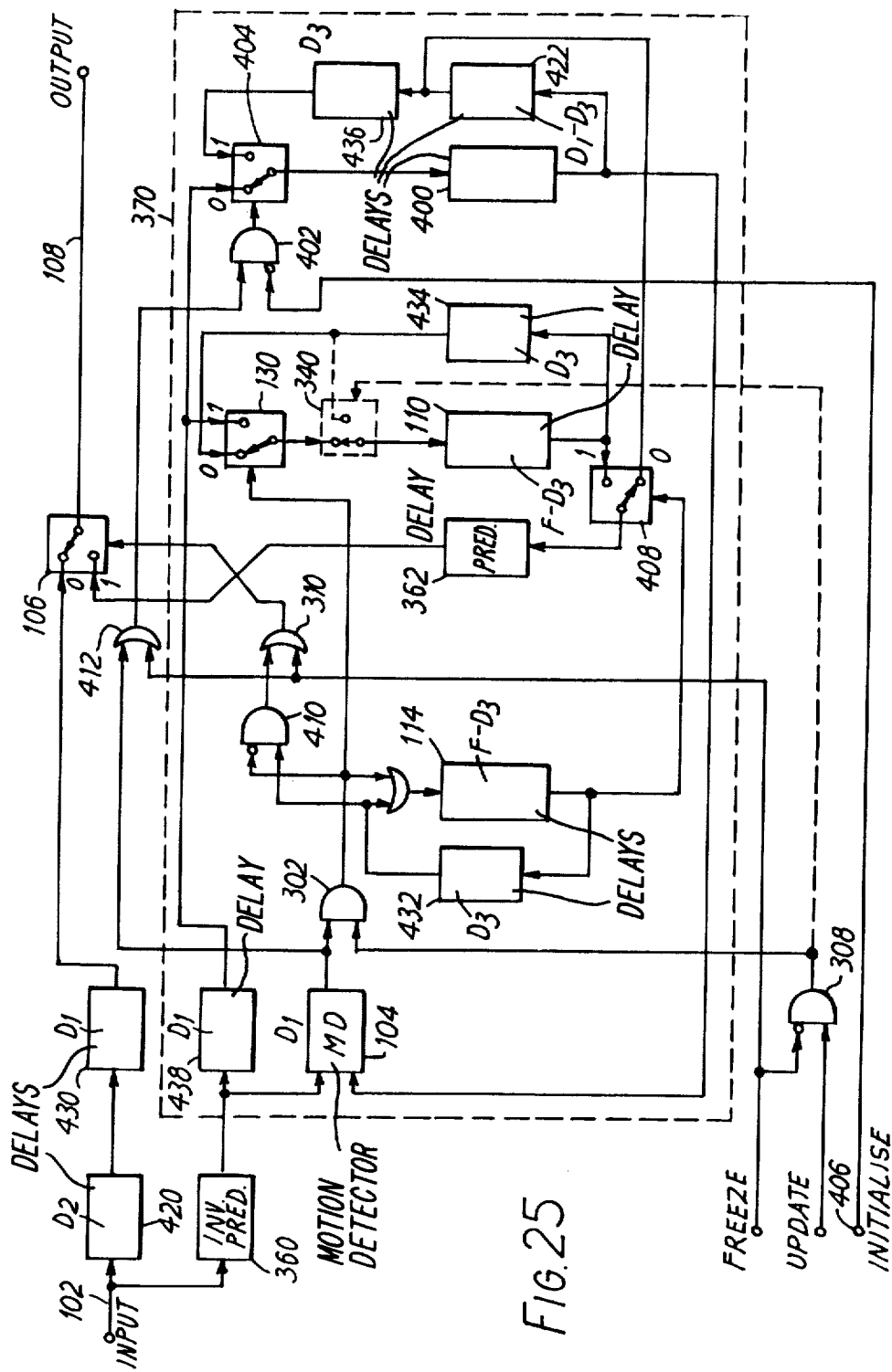
FIG. 25 shows a preferred embodiment based on FIG. 24 and adapted for colour operation.

The systems described above suffer from one disadvantage. This is that if the superposed images from two selected fields overlap, the older images obscure the newer ones. This, which may be termed "reverse obscuring" is unrealistic. FIGS. 23 to 25 show arrangements which overcome this problem by making use of an additional one-field image store.

FIG. 23 shows an extra image store 400 used to store the image with which the current input is compared. Keyed images are stored in store 110 and flags in store 114. At the start, store 400 takes the initial field, under the control of a gate 402 and switch 404, the gate 402 being operated by an initialisation input 406. Thereafter store 400 only recirculates when a difference is detected in the motion detector 104 between the image in store 400 and the current image. Thus, it does not store the subsequent images of the moving objects but updates the background every field.

The positions of the moving objects enter store 114 and their images enter store 110 via switch 130. Then store 110 contains only the most recent moving images. It need not be cleared, but store 114 must be cleared before a track begins. As before, the flag output of store 114 controls switch 106 and causes it to select keyed images via a switch 408 instead of the input 102. An extra gate 410 allows a new flag to override an old flag, so that if the current position overlaps the old position, the current image is transmitted via switch 106 to the output. Also, switch 130 ensures that the new image overwrites the old image in store 110. This gives "normal obscuring".

The freeze signal inhibits updating via gate 308 and overrides the flag signal into switch 106 via gate 310 as described above. Also, the freeze signal overrides the flag signal into switch 404 via a gate 412, thereby causing the store 400 to recirculate its information. The frozen output signal is obtained via switch 106 and switch 408, which selects frozen keyed images or background according to the flag signal at the output of store 114. Hence, it is important that the flag signal is not destroyed during the freeze operation as it is needed to assemble the frozen picture.

As before, the network of FIG. 20 may replace switch 130 if the decayed image option is required. Store 110 then stores decayed images with normal obscuring.

In either event the displayed image will, in areas where there is overlap between two positions of the ball or other object, give precedence to the most recent position.

FIG. 24 is an extension of FIG. 23 to allow for the delay D1 of the movement detector 104. As the flag control for switch 106 is now derived via gate 410 which takes current information, it is not possible to allow for the detector delay by shortening the flag store 114. Therefore the image signals to switch 106 must be delayed. Thus an extra delay 420 is required between the input 102 and switch 106 equal to that of the detector 104. Correct relative timing of the two detector inputs requires the output of store 400 to be shortened by the same delay, so that an extra delay 422 is also required.

Finally, FIG. 25 is an extension of FIG. 24 for colour operation. As in FIG. 22, predictors 360 and 362 are used. As before the delay of the inverse predictor 360 cannot be accommodated in store 114 because the flag to switch 106 contains current information. Thus, extra compensating delays 420 and 430 must be present in the image feed to switch 106. Correct timing of the flag into switch 408 requires store 114 to be shortened by the delay of the predictor 362. Hence, an extra delay 432 is required. Similarly, correct timing for image signals into switch 408 requires stores 110 and 422 to be shortened by the same delay. Hence, extra delays 434 and 436 are required. Also, a delay 438 is included between the predictor 360 and switch 404 to compensate for the movement detector delay.

As before, switch 130 may be replaced by the network of FIG. 20 to obtain decayed images. The predictors can be replaced by a decoder and coder, with appropriate additions to the circuitry.

The overall delay from input to output is the sum of the movement detector delay and the inverse predictor delay. Only keyed images suffer the impairment of cascaded predictors during path development.

It should be remembered that in all the arrangements illustrated the picture information which is not deemed to be moving is not frozen in position during the development of the moving path, but rather this background information is allowed to change slowly and thereby appears more natural. Furthermore, where colour signals are involved due account can be taken of the 8-field PAL cycle or the 4-field NTSC cycle without undue constraints being placed on the operation and with a minimum of corruption produced in the displayed signal. Also the motion detector used provides a relatively reliable assessment of whether motion has in fact taken place.

We claim:

1. A method of portraying movement with a raster display, comprising the steps of:
storing a scan of the display;
comparing a subsequent input scan with the stored scan to detect differences therebetween which may represent motion of a displayed object;
retaining a continuing indication of the positions on the display of the differences thus detected;
retaining the portions of the input scan at positions for which a new difference is detected, and no difference has been detected previously; and
including in the output display the thus-retained portions.

2. A method according to claim 1, in which the stored scan is successively updated to include at least the portions of subsequent input scans for which no differences are detected.

3. A method according to claim 1, in which the input signals are PAL colour television signals, the stored display is retained in one state of the 8-field PAL cycle, and the signals are transformed to that state before storage and back from that state before comparison and display.

4. A method according to claim 1, in which the input signals are NTSC colour television signals, the stored display is retained in one state of the 4-field NTSC cycle, and the signals are transformed to that state before storage and back from that state before comparison and display.

5. Apparatus for portraying movement with a raster display, comprising:
an input;
a main store coupled to the input for storing a scan of the display;
movement detection means coupled to the input and the main store for comparing a subsequent input scan with a scan stored in the main store to detect differences therebetween which may represent motion of a displayed object;
auxiliary storage means coupled to the movement detection means for retaining a continuing indication of the positions on the display of the differences detected by the movement detection means; and
adaptive means being included to ensure retention of the portions of the input scan at positions for which a new difference is detected, and no difference has been detected previously, and to apply the thus-retained portions to an output.

6. Apparatus according to claim 5, including means for causing the contents of the main store and the auxiliary storage means to be updated on selected scans only and to be renewed on the other scans.

7. Apparatus according to claim 5, including means for causing the contents of the main store and the auxiliary storage means to be renewed continuously to provide a frozen display.

8. Apparatus according to claim 5, in which the main store and the auxiliary storage means are split to provide two or more delay times to compensate for delays introduced by other components.

9. Apparatus according to claim 5, in which the adaptive means comprises two selector switches, one of which provides the output of the apparatus, and the other of which provides the input for the main store.

10. Apparatus according to claim 5, including a second main store connected to store portions of the scan for which differences have been detected, the first-mentioned main store being connected to store the most recent scan portions for which no differences have been detected.

11. Apparatus according to claim 5, in which the movement detection means comprises a subtractor, rectifying means, a spatial filter, and a threshold circuit, connected together in series.

12. Apparatus according to claim 5, for use with NTSC colour television signals, in which the main store is adapted to return stored information in one state of the 4-field NTSC cycle, and including means for transferring to that state before storage in the main store and back from that state before application to the output for display.

13. Apparatus according to claim 5, in which the said adaptive means is arranged successively to update the main store, whereby the main store includes at least the portions of subsequent input scans for which no differences are detected.

14. Apparatus according to claim 13, including combining means coupled to the output of the movement detection means and to the auxiliary storage means to combine indications of differences detected by the movement detection means on a scan with indications of differences detected on previous scans.

15. Apparatus according to claim 13, in which the scan is a raster scan consisting of two interlaced fields having differing numbers of lines, and including means coupled to the main store and the auxiliary storage means to vary the effective capacity of the main store and the auxiliary storage means in synchronism with the variation in field lengths.

16. Apparatus according to claim 15, including means for interpolating between two lines from the main store on alternate field scans to provide a signal in the said portions of the input scan which is applied to the movement detection means and to the output of the apparatus.

17. Apparatus according to claim 16, further including means coupled between the input and the main store for interpolating between two lines on alternate field scans.

18. Apparatus according to claim 5, including means for successively attenuating the amplitudes of the differences stored in the main store and inserted in the said portions of the scan.

19. Apparatus according to claim 18, including a subtractor coupled to the input and the output of the main store, an attenuator controlled by the output of the auxiliary storage means and coupled to the output of the subtractor, and an adder coupled to the outputs of the attenuator and the main store.

20. Apparatus according to claim 5, for use with PAL colour television signals, in which the main store retains stored information in one state of the 8-field PAL cycle, and including means for transforming to that state before storage in the main store and back from that state before application to the output for display.

21. Apparatus according to claim 20, in which the signal from the main store is transformed back into the state of the input signals before application to the movement detection means.

22. Apparatus according to claim 20, including transform means coupled between the input and the movement detection means.

* * * * *